United States Patent [19]
Oppermann et al.

[11] Patent Number: 6,144,377
[45] Date of Patent: Nov. 7, 2000

[54] PROVIDING ACCESS TO USER INTERFACE ELEMENTS OF LEGACY APPLICATION PROGRAMS

[75] Inventors: Charles Oppermann, Redmond; Laura J. Butler; Steven M. Donie, both of Seattle; Peter Kam-Ho Wong, Mercer Island, all of Wash.

[73] Assignee: Microsoft Corporation, Redmond, Wash.

[21] Appl. No.: 08/815,101

[22] Filed: Mar. 11, 1997

[51] Int. Cl.$^7$ .................................................. G06F 3/00
[52] U.S. Cl. ............................................................ 345/335
[58] Field of Search ..................................... 345/156, 335, 345/349, 334, 330, 346, 350, 329, 978; 395/500, 340, 200, 682, 683, 701, 680; 709/300, 302

[56] References Cited

U.S. PATENT DOCUMENTS

| | | | |
|---|---|---|---|
| 5,548,723 | 8/1996 | Pettus ........................................ | 345/329 |
| 5,604,896 | 2/1997 | Duxbury et al. ......................... | 395/500 |
| 5,634,127 | 5/1997 | Cloud et al. ............................. | 395/680 |
| 5,673,403 | 9/1997 | Brown et al. ............................ | 345/156 |
| 5,708,786 | 1/1998 | Teruuchi ................................... | 395/340 |
| 5,754,830 | 5/1998 | Butts et al. .............................. | 395/500 |
| 5,758,074 | 5/1998 | Marlin et al. ............................ | 395/200 |
| 5,793,368 | 8/1998 | Beer ......................................... | 345/343 |
| 5,838,916 | 11/1998 | Domenikos et al. .................... | 345/330 |

*Primary Examiner*—Jeffery A. Brier
*Attorney, Agent, or Firm*—Banner & Witcoff, Ltd.

[57] ABSTRACT

An architecture is provided that enables an accessibility aid to directly access and manipulate user interface elements of an application program programmatically. Moreover, such access and manipulation occurs in an application-independent manner, so that an accessibility aid utilizing the architecture can access the user interface elements of any application program that conforms to the architecture, without the accessibility aid needing any prior knowledge of the application program or its user interface elements. User interface elements typically have both a visual representation displayed on the video display and an implementation, which is the code and data implementing the user interface element. The architecture provides an accessibility aid with direct access to the implementation of user interface elements, thus enabling the accessibility aid to both examine various characteristics of the user interface element and manipulate these characteristics, which may affect its visual representation. Although this architecture provides many benefits to accessibility aids, some application programs predate the preferred architecture and are thus unable to support this architecture. The present system supports the architecture on behalf of such application programs, known as legacy application programs, to retrofit or integrate these application programs into the architecture.

59 Claims, 16 Drawing Sheets

PROVIDING ACCESS TO USER INTERFACE ELEMENTS OF LEGACY APPLICATION PROGRAMS

TECHNICAL FIELD

The present invention relates generally to data processing systems and, more particularly, to providing access to user interface elements of legacy application programs.

BACKGROUND OF THE INVENTION

People with disabilities have had difficulty being integrated into the workforce. Such integration into the workforce is hampered by difficulties in working with computers. Consequently, accessibility aids have been developed to facilitate computer operation by disabled users. For example, a "screen reader utility" is a type of accessibility aid that reads information displayed on a video display to a visually impaired user, which enables the user to utilize the computer. These screen reader utilities operate by intercepting and analyzing information sent to the video driver. That is, when an application program wants to display information on the video display, it sends the information to a video driver, which is responsible for displaying the information on the video display. For example, when an application program wants to display a character, such as an ASCII character, the program sends an ASCII character code to the video driver indicating which character of the ASCII character set to display on the video display. The screen reader intercepts this ASCII character code, determines the phonetic sounds associated with the ASCII character, and audibly outputs the phonetic sounds to the visually impaired user, so that the visually impaired user can perceive the character written to the video display.

Although these screen reader utilities work well with text, screen reader utilities do not work well with graphical elements, such as the well-known graphical elements depicted in FIGS. 1A–1D. For example, FIG. 1A depicts a window with a menu bar, a title bar, a tool bar, a combo box, a header control, a tree view, a status bar, a list view, a size grip, and a scroll bar. FIG. 1B depicts a window with a progress bar, a check box-style button and status text. FIG. 1C depicts a window with an edit box and a push button-style button, and FIG. 1D depicts a window with a tab control, a list box, and a radio button-style button.

When a program wants to display a graphical element, like a button, on the video display, it sends a bitmap to the video driver containing the representation of the button. The screen reader intercepts this bitmap, and the screen reader then attempts to interpret the bitmap. To facilitate this interpretation, the screen reader maintains a database containing both the bitmaps representing the graphical elements utilized by a particular application program and an indication of what each bitmap represents. The screen reader compares the intercepted bitmap with the bitmaps in the database to determine the graphical element represented by the intercepted bitmap, and then the screen reader audibly indicates to the user what the graphical element is. In this manner, the screen reader audibly indicates to the user what information is displayed on the video display, including both text and graphical elements.

This method for analyzing a graphical element has a drawback: the screen reader utility must know in advance the exact bitmaps of the graphical elements utilized by a particular application program. Even the slightest variation between the bitmap sent to the video driver and the corresponding bitmaps in the database will prevent a match from being made, and the screen reader will be unable to identify the graphical element. In this case, the user receives an incomplete understanding of the information on the video display, thus reducing his or her effective use of the computer system. Hence, conventional screen readers must contain the bitmaps of the graphical elements utilized by a particular application program; conventional screen readers are thus application dependent. In other words, conventional screen readers cannot convey to a user information regarding graphical elements displayed by an application program without having a prior knowledge of the exact form of its graphical elements, and the screen reader will not work on another application program without having similar prior knowledge. As a result of these limitations, screen readers, and accessibility aids as a whole, are unreliable and do not convey sufficient information to a disabled user so that the user can understand all elements that are displayed on the video display, including both text and graphical elements. It is thus desirable to improve the way in which accessibility aids identify the elements displayed by an application program to help integrate disabled users into the work force.

Because the detailed description assumes knowledge of various well-known object-oriented techniques, an overview of such techniques is provided below. In some cases, this overview is specific to the C++ programming language.

Two common characteristics of object-oriented programming languages are support for data encapsulation and data type inheritance. Data encapsulation refers to associating functions with data, and inheritance refers to declaring a data type in terms of other data types. Thus, inheritance provides for a hierarchy of data types, where the data types defined lower in the hierarchy share the structure or behavior of the data types defined higher in the hierarchy.

In the C++ programming language, data encapsulation and inheritance are supported through the use of classes. A class is a defined type, and a class declaration describes the data members and function members of the class. The data members and function members of a class are bound together such that the function members operate on a particular instance of the data members of the class. An instance of a class is also known as an object of the class. A class thus provides a definition for a group of objects with similar properties and common behavior.

To allocate storage for an object of a particular type (class), an object is instantiated. The term "instantiating" refers to allocating memory for data members and associating the data members with the function members. Once instantiated, the function members of the particular object can be invoked to access and manipulate the data members. In this manner, the function members implement the behavior of the object, and the object provides a structure for encapsulating data and behavior into a single entity.

To support the concept of inheritance, classes may be derived from (based upon the declaration of) other classes. A derived class is a class that inherits the characteristics—data members and function members—of its base classes. A class that inherits the characteristics of another class is a derived class, and conversely, a class that does not inherit the characteristics of another class is a primary (root) class. A class whose characteristics are inherited by another class is a base class. A derived class may inherit the characteristics of several classes and have several base classes, which is known as multiple inheritance.

A class may also specify whether its function members are virtual. Declaring that a function member is virtual allows the function to be overridden by a function of the same name and type in a derived class. If a virtual function is declared without providing an implementation, then it is referred to as a pure virtual function. A pure virtual function is a virtual function declared with the pure specifier ("=0"). If a class specifies a pure virtual function, then any derived class needs to specify an implementation for that function member before an object of that class can be instantiated. A class which contains at least one pure virtual function member is an abstract class.

FIG. 2 is a block diagram illustrating typical data structures used to represent an object. An object comprises instance data (data members) and function members, which implement the behavior of the object. The data structures used to represent an object comprise instance data structure 201, virtual function table 202, and the function members 203, 204, 205. The instance data structure 201 contains a pointer to the virtual function table 202 and contains data members. The virtual function table 202 contains an entry for each virtual function member defined for the object. Each entry contains a reference to the code that implements the corresponding function member. In the following, an object will be described as an instance of a class as defined by the C++ programming language. One skilled in the art, however, will appreciate that other object models can be defined using other programming languages.

An advantage of using object-oriented techniques is, these techniques can be used to facilitate the sharing of objects. For example, a program implementing the function members of an instantiated object (a "server program") can share the object with another program (a "client program"). To allow an object of an arbitrary class to be shared with a client program, interfaces are defined through which an object can be accessed without the need for the client program to have access to the class implementation at compile time. An interface is a named set of logically related function members ("methods") and data members ("properties"). In C++, an interface is implemented as an abstract class with no data members and whose virtual functions are all pure. Thus, an interface provides a published protocol for two programs to communicate. Interfaces are typically used for derivation: a program defines (implements) classes that provide implementations for the interfaces the classes are derived from. Thereafter, objects are created as instances of these derived classes. Objects instantiated from a derived class implementing particular interfaces are said to "support" the interfaces. Typically, an object supports one or more interfaces depending upon the desired functionality.

The above-described object-oriented techniques have been successfully employed in Microsoft Corporation's Object Linking and Embedding (OLE) system. OLE is an object-based system in which each object conforms to the component object model by exposing a number of predefined interfaces. One of these interfaces is the IUnknown interface which contains the QueryInterface function member, and this function member provides access to all of the other interfaces supported by the object. Another interface supported by objects conforming to the component object model is the IDispatch interface, which allows the function members of an object to be invoked by a client without the client knowing at compile time the definition of the function member, which is known as dynamic binding. The IDispatch interface is described in greater detail in U.S. Pat. No. 5,515,536, entitled "Method and System for Invoking Methods of an Object Through a Dispatching Interface," issued May 7, 1996, which is hereby incorporated by reference. More generally, however, both OLE and the component object model are described in greater detail in Brockschmidt, *Inside OLE*, Second Edition, Microsoft Press (1995), at pages 1–143 and 635–730.

SUMMARY OF THE INVENTION

An architecture is provided that enables an accessibility aid to directly access and manipulate user interface elements of an application program programmatically. Moreover, such access and manipulation occurs in an application-independent manner, so that an accessibility aid utilizing the architecture can access the user interface elements of any application program that conforms to the architecture, without the accessibility aid needing any prior knowledge of the application program or its user interface elements. User interface elements typically have both a visual representation displayed on the video display and an implementation, which is the code and data implementing the user interface element. The architecture provides an accessibility aid with direct access to the implementation of user interface elements, thus enabling the accessibility aid to both examine various characteristics of the user interface element and manipulate these characteristics, which may affect its visual representation. Although this architecture provides many benefits to accessibility aids, some application programs predate the preferred architecture and are thus unable to support this architecture. The present system supports the architecture on behalf of such application programs, known as legacy application programs, to retrofit or integrate these application programs into the architecture.

In accordance with a first aspect of the present invention, a method is practiced in a computer system for accessing user interface elements of an application program by a client. The user interface elements are managed by an operating system. The client sends to the operating system a request to modify a characteristic of one of the user interface elements and receives from the operating system an indication that the characteristic has been modified.

In accordance with a second aspect of the present invention, a method is practiced in a computer system for providing access to user interface elements managed by an operating system. The operating system creates an instance of an interface for at least one of the user interface elements. This interface contains functions members for use in accessing the user interface elements. Furthermore, the operating system exposes the instance of the interface to a client to provide the client with access to the user interface element via the function members of the interface.

In accordance with a third aspect of the present invention, a method is practiced in a computer system for accessing user interface elements of an application program that are managed by an operating system. The user interface elements are related to each other via a plurality of relations. The operating system receives a programmatic request from a client both indicating one of the user interface elements of the application program and indicating one of the plurality of relations. The operating system returns to the client a reference to a related user interface element that is related to the indicated user interface element via the indicated relation.

DETAILED DESCRIPTION OF THE INVENTION

Figure 1A:
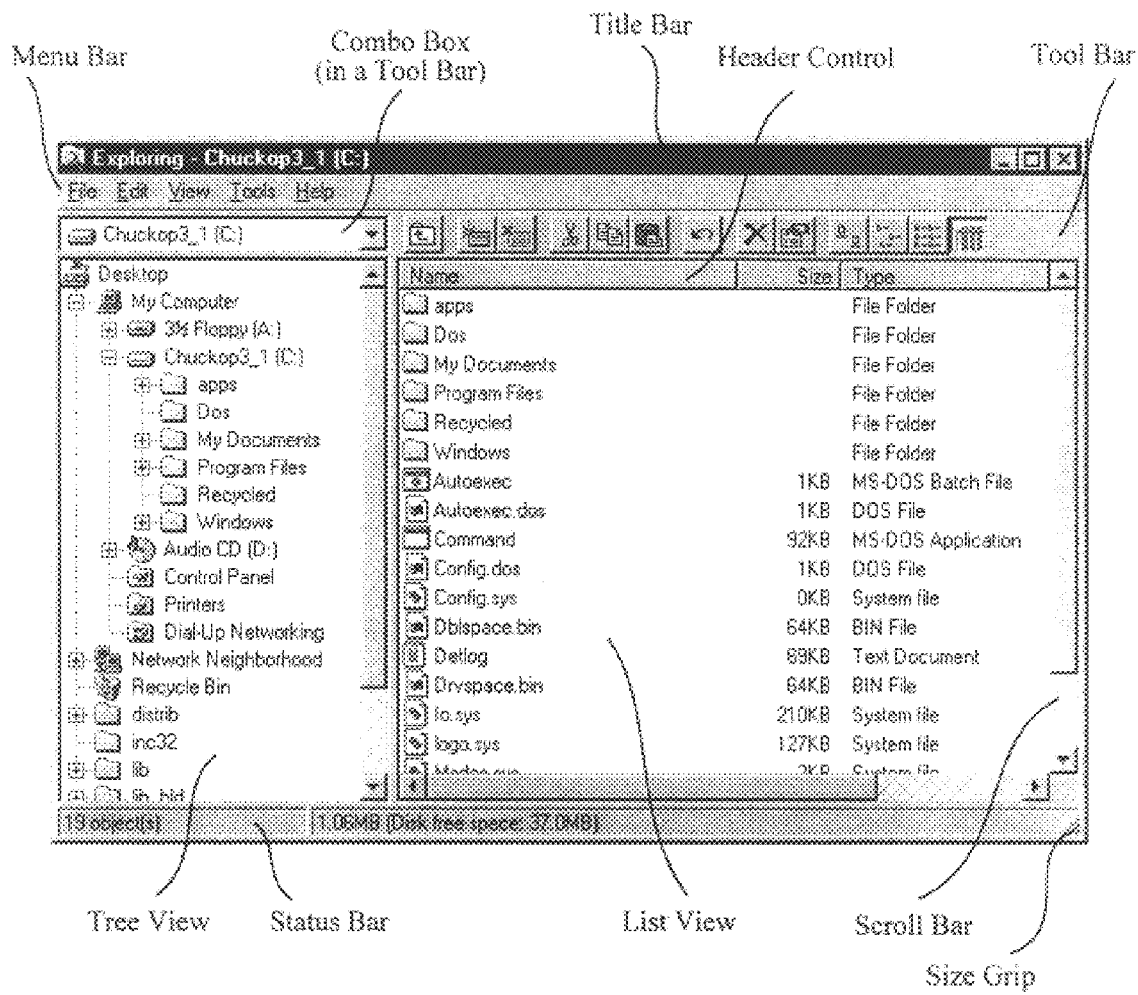
FIGS. 1A–1D depict various well-known graphical elements.
Figure 1B:
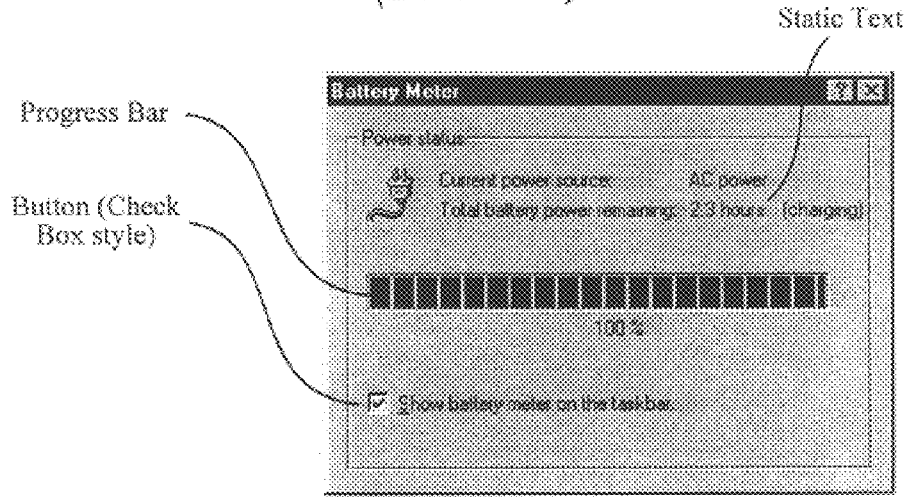
Figure 1C:
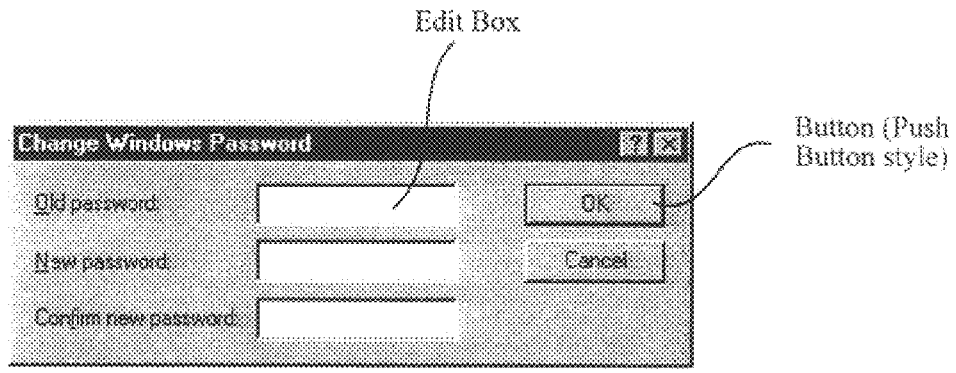
Figure 1D:
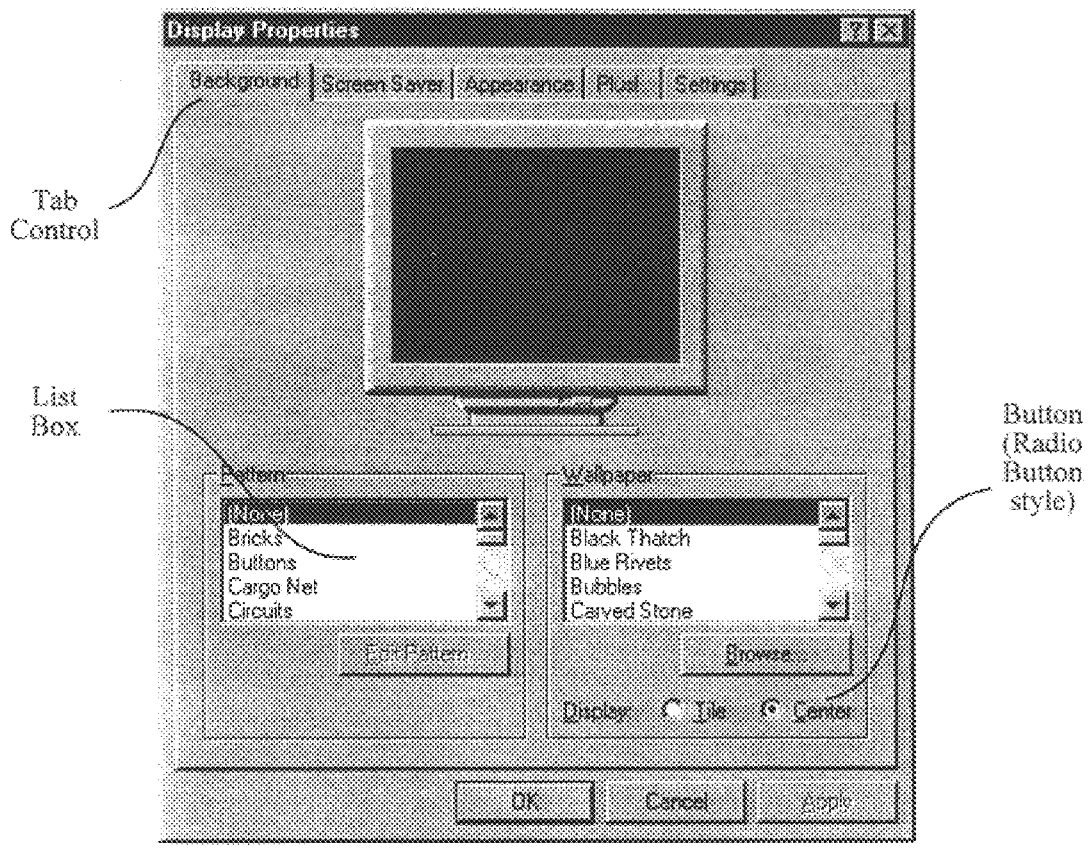
Figure 2:
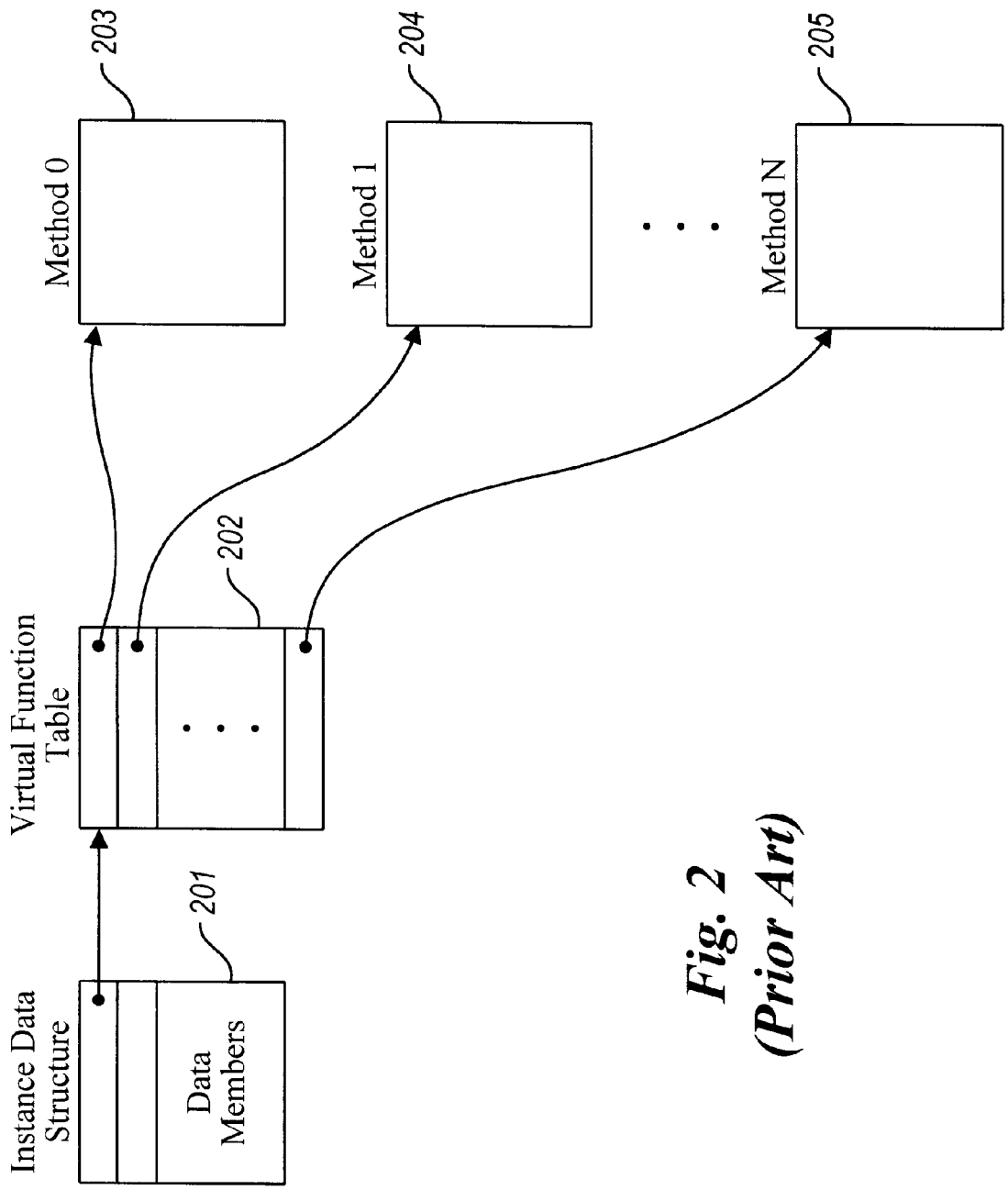
FIG. 2 is a block diagram illustrating conventional data structures used to represent an object.

A preferred embodiment of the present invention provides an architecture that enables an accessibility aid to directly access and manipulate user interface elements of an application program programmatically. Moreover, such access and manipulation occurs in an application-independent manner, so that an accessibility aid utilizing the preferred architecture can access the user interface elements of any application program that conforms to the preferred architecture, without the accessibility aid needing any prior knowledge of the application program or its user interface elements. A "user interface element" is information displayed on the video display that conveys meaning to a user, including both text and graphical elements like buttons, scroll bars, toolbars, edit boxes, and windows. User interface elements typically have both a visual representation displayed on the video display and an implementation, which is the code and data implementing the user interface element. The preferred architecture provides an accessibility aid with direct access to the implementation of user interface elements, thus enabling the accessibility aid to both examine various characteristics of the user interface element and manipulate these characteristics, which may affect its visual representation.

The preferred architecture can be supported in two ways. First, the application program can be developed such that it natively supports the preferred architecture. This manner of supporting the preferred architecture is described in co-pending U.S. patent application Ser. No. 08/815,100, entitled "Programmatically Providing Direct Access to User Interface Elements of an Application Program," assigned to a common assignee, filed on even date herewith, which is hereby incorporated by reference. The second manner in which the preferred architecture can be supported is as a proxy, where the operating system supports the preferred architecture on behalf of the application program. This second manner of supporting the preferred architecture is useful when the application program is a "legacy application program" such that the application program either predates the preferred architecture or simply does not support the preferred architecture. A preferred embodiment of the present invention supports the preferred architecture on behalf of legacy application programs, so that accessibility aids can access and manipulate the user interface elements of such legacy application programs.

By utilizing the preferred architecture, accessibility aids can access and manipulate the user interface elements of any legacy application program without the need to have a priori knowledge of the application program or its user interface elements. An accessibility aid communicates directly to the implementation of the user interface elements as managed by the operating system via the preferred architecture, and the accessibility aid can thus obtain a complete and rich description of the legacy application program's user interface elements and can manipulate these user interface elements. Upon receiving the description of the user interface elements, the accessibility aid can convey this description to a disabled user via means which they can perceive, such as through audible output.

Overview

Figure 3:
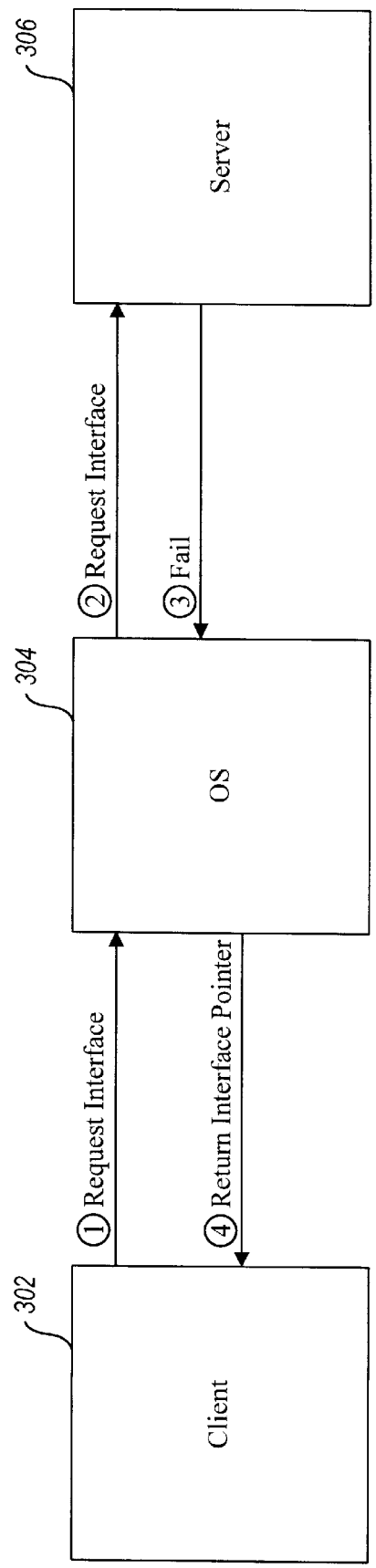
FIG. 3 depicts the interactions between a client, an operating system, and a server when obtaining a reference to an IAccessible interface.

FIG. 3 depicts an overview of the various components utilized in a preferred embodiment of the present invention. These components include a client 302, such as an accessibility aid, the operating system 304, and a server 306, such as a legacy application program. In order to utilize the preferred architecture, the client 302 first requests a pointer to an IAccessible interface from the operating system 304 for a particular user interface element of the server 306, The IAccessible interface contains function members that enable the client 302 to access and manipulate one or more user interface elements of the server 306. After the client requests a pointer to the IAccessible interface from the operating system 304, the operating system requests a pointer to this interface from the server 306. If the server supports the interface for its user interface elements, the server 306 returns a pointer to the IAccessible interface for a particular user interface element as is clearly described in co-pending U.S. patent application Ser. No. 08/815,100, entitled "Programmatically Providing Direct Access to User Interface Elements of an Application Program," which has previously been incorporated by reference. However, in the present system, the server 306 is a legacy application program and does not support such an interface. Therefore, the request for the pointer to the IAccessible interface fails, and the server 306 sends an indication of this failure to the operating system 304. Upon receiving the failure indication, the operating system 304 instantiates an IAccessible interface on behalf of the server 306 and passes a pointer to this interface to the client 302, so that the client can access and manipulate the user interface elements of the server 306. To instantiate an IAccessible interface, the operating system 304 has an implementation for each of the function members on the interface. The operating system 304 is able to provide an implementation of the function members because the server 306 implements most of its user interface elements using standard function calls of the operating system. Therefore, the operating system 304 manages these user interface elements and has internal representations of them. To perform the functionality of the various function members, the operating system accesses and manipulates its internal representations of the server's user interface elements.

When the client 302 receives a pointer to the IAccessible interface of a user interface element of the server 306, the client can invoke the function members on the interface to directly access and manipulate the implementation of this user interface element. These function members allow the client 302 to access the user interface elements in the following ways: by navigating through the user interface elements, by retrieving the name for each user interface element, by determining whether each user interface element is visible or hidden, by retrieving a text description for each user interface element, by identifying the location of the user interface element, by determining the parent or child of a user interface element, and by determining the value of the user interface element. Some user interface elements have an associated value. For example, a clock user interface element has a value of the current time.

Additional function members on the IAccessible interface, instead of accessing the user interface element, enable the client to manipulate or modify characteristics of the user interface element. For example, these function members can perform the default action associated with the user interface element, select the user interface element, or set the value of the user interface element. Each user interface element capable of performing an action, such as a button, typically has an associated default action, like being pressed. One of the function members on the IAccessible interface allows a client to invoke the default action of a user interface element. Also, some user interface elements, such as text, are capable of being selected, which is typically indicated by highlighting the user interface element (e.g., the text) on the video display, and one of the function members on the IAccessible interface allows a client to select a user interface element. When a user interface element is selected, it can be manipulated in many well-known ways, like cutting, pasting, moving, or dragging and dropping. Although only a subset of the function members have been briefly described, each of the function members is described in greater detail below.

Implementation Details

Figure 4:
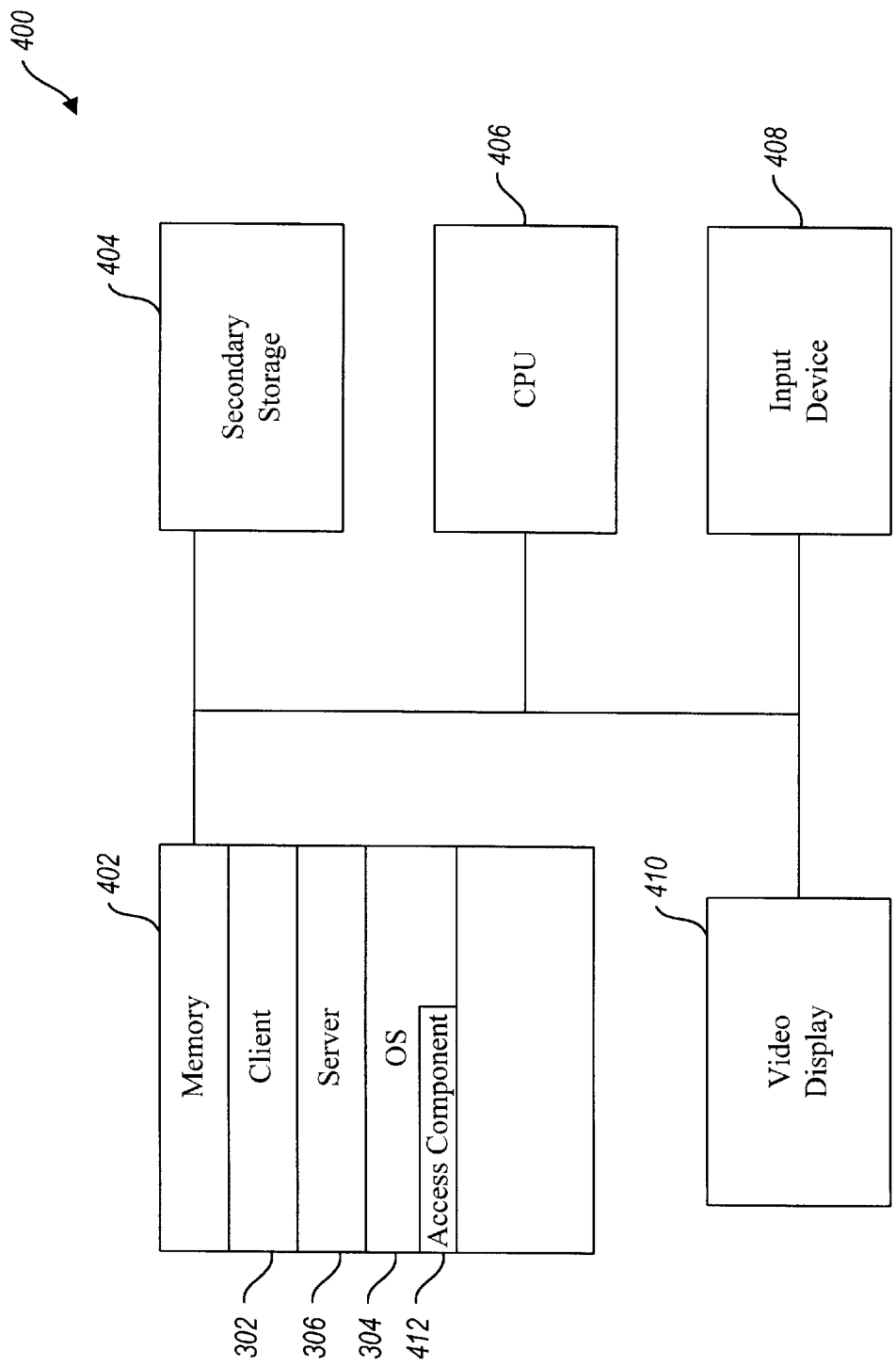
FIG. 4 depicts a computer system suitable for practicing a preferred embodiment of the present invention.

FIG. 4 depicts a computer system 400 that is suitable for practicing a preferred embodiment of the present invention. The computer system 400 contains a memory 402, a secondary storage device 404, a central processing unit (CPU) 406, an input device 408, and a video display 410. The memory 402 contains the client 302, the server 306, and the operating system 304. The operating system 304 contains an access component 412 that both facilitates communication between the client 302 and the server 306 for accessibility-related processing and creates an IAccessible interface on behalf of the user interface elements of the server. The access component 412 is a dynamic link library that is linked to the operating system 304 at runtime. An example of an operating system 304 suitable for use in the computer system 400 is the Windows® 95 operating system available from Microsoft Corporation of Redmond, Washington. The client 302 utilizes the function members on the IAccessible interface provided by the access component 412 on behalf of the server 306. The server 306 displays the user interface elements on the video display 410. Although a preferred embodiment of the present invention is described below as conforming to the OLE architecture, one skilled in the art will appreciate that the present invention can work in other object-based systems or non-object-based systems.

As stated above, the operating system 304 is a window-based operating system, like Windows® 95. In this type of system, each window is created based on a window class, which identifies a window procedure that performs the functionality of the window in response to receiving messages. In order to invoke the functionality of a window, a caller sends a message to the window procedure of the window, and the window procedure then performs the desired functionality. Each user interface element in the system is implemented as a window, so it has both a window class and a window procedure. The window class defines general characteristics of a window, like the type or class of the window (e.g., button, scroll bar, edit box), and thus allows the same window class to be used for creating many different windows. An instance of a window class is known as a window object or a "window."

When creating a window, the well-known CreateWindow function is utilized, passing in various information. For example, a "WindowClassName" is passed into the CreateWindow function identifying the type of window class, such as a button, scroll bar, etc. Additional information passed into the CreateWindow function includes an indication of the window's parent. The CreateWindow function can thus be utilized to associate windows in a parent/child relationship. Two windows (or user interface elements) have a parent/child relationship when the parent maintains control over the child window, where typically the child window appears on the surface of the parent window (i.e., the child window is displayed within the borders of the parent window). When the CreateWindow function is utilized to create two windows with a parent/child relationship, the operating system maintains an association between the two windows. Upon completion, the CreateWindow function returns a "window handle," which is sometimes referred to as an "HWND." This window handle refers to the window created and is utilized in both function calls that manipulate the window and messages to the window procedure of the window. Window procedures, window classes, and, more generally, the programming environment of the Windows® operating system is described in greater detail in Petzold, Programming Windows 3.1, 3rd Edition, Microsoft Press (1992), at pages 1–45.

Figure 5:
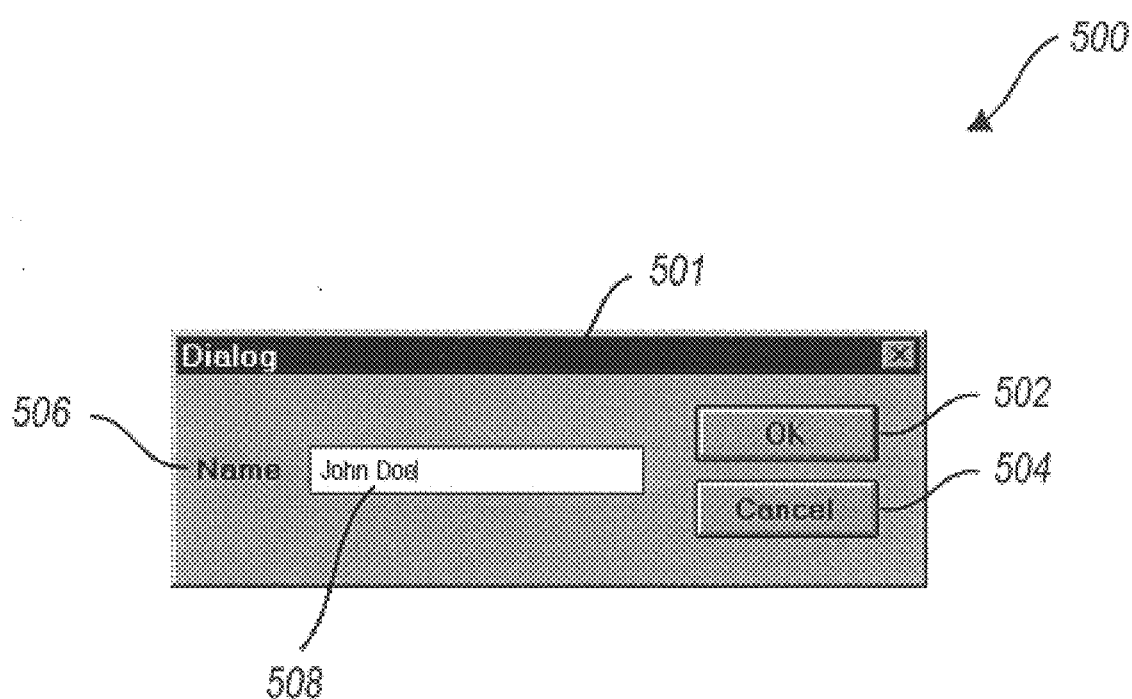
FIG. 5 depicts a user interface containing a dialog box with a number of child user interface elements.

FIG. 5 depicts an example user interface 500 of a legacy application program containing a window 501, which is a dialog box, with various child user interface elements, including an OK button 502, a cancel button 504, an edit box 508, and static text 506 indicating the type of information that the user should enter into the edit box. A "dialog box" is a user interface element typically used for obtaining additional input from the user.

Figure 6:
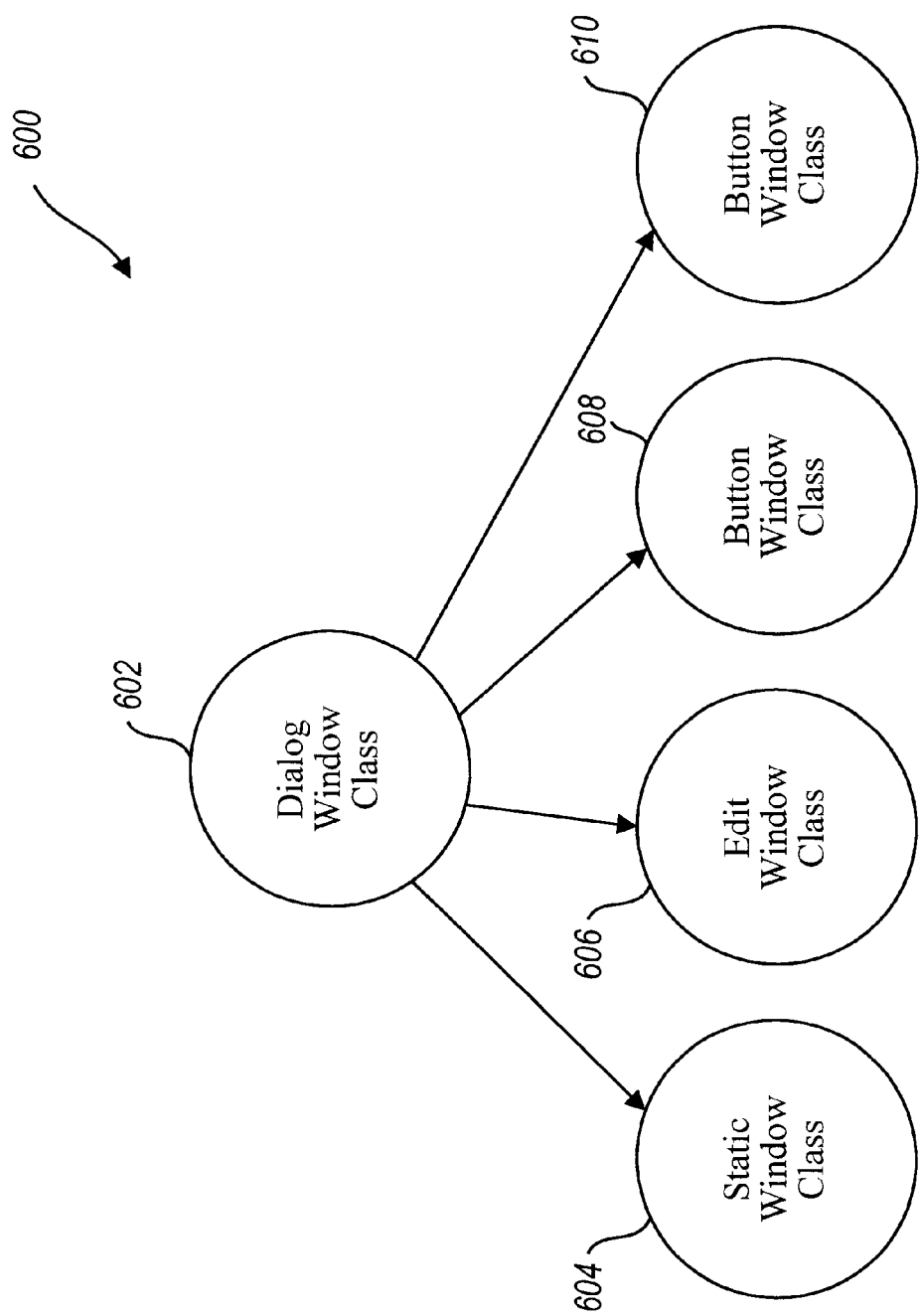
FIG. 6 depicts a window class hierarchy of the user interface elements depicted in FIG. 5.

FIG. 6 depicts the hierarchy of the window classes for the example user interface of FIG. 5. The window class hierarchy 600 is maintained by the operating system and has the dialog window class 602 at the top of the hierarchy, because it is the parent. The operating system maintains an association between the dialog window class 602 and the window classes of each of the user interface elements that are displayed within its border (i.e., its children), including a static window class 604, an edit window class 606, a button window class 608 for the OK button and a button window class 610 for the cancel button. Each of these window classes has an associated name. For example, the name of the dialog window class is the title that it displays (i.e., "dialog"). The name of the static window class is "&NAME." The "&" indicates that the following letter, "N," is a shortcut key such that if the user depresses the "ALT" key and the "N" key together, the keyboard focus will move to the edit box. The edit window class 606 has a name of "John Doe" which is the text entered by the user. The name of the button window class 608 is "OK," and the name of the button window class 610 is "cancel."

The access component provides a number of functions that are each utilized by the client to retrieve a pointer to an IAccessible interface for a user interface element of the server based on particular information that the client has about the user interface element. For example, the AccessibleObjectFromPoint function receives as input a location on the video display and returns a pointer to the IAccessible interface of the user interface element at that location. The access component also has an AccessibleObjectFromWindow and an AccessibleObjectFromEvent functions which receive as input a window handle and various event-related information, respectively, and which return a pointer to the IAccessible interface of the indicated user interface element. These functions are defined in greater detail in co-pending U.S. patent application Ser. No. 08/815,100, entitled "Programmatically Providing Direct Access to User interface Elements of an Application Program," which has previously been incorporated by reference.

Figure 7:
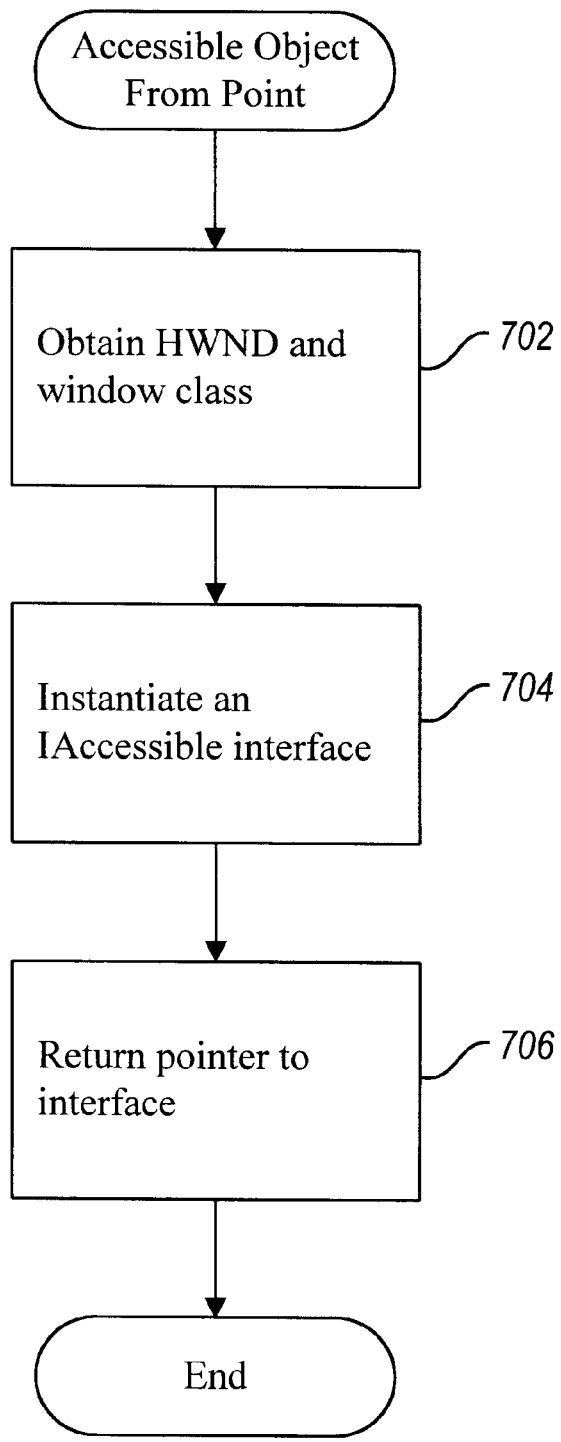
FIG. 7 depicts a flowchart of the steps performed by the AccessibleObjectFromPoint function.

FIG. 7 depicts a flowchart of the steps performed by the AccessibleObjectFromPoint function provided by the access component. The first step performed by the AccessibleObjectFromPoint function is to obtain the window handle and the window class for the user interface element at the indicated location on the video display (step 702). The AccessibleObjectFromPoint function performs this functionality by invoking the well-known WindowFromPoint function of the operating system to obtain the window handle and the window class. After obtaining this information, the AccessibleObjectFromPoint function instantiates an IAccessible interface for the particular type (or class) of user interface element (step 704). As is further discussed below, the access component maintains an interface data structure for each of the various types of windows that it supports (e.g., dialog interface class, edit interface class, and button interface class), and in this step, the access component creates an instance of the interface by invoking the well-known "new" operator of the C++ programming language. In addition, the AccessibleObjectFromPoint function initializes the function members and the properties on the interface. For example, one of the properties on the IAccessible interface is the name property, and in this step, the AccessibleObjectFromPoint function stores the name of the user interface element into this property. Additionally, the window handle obtained in step 702 ("the current window handle") is stored as a data member of the IAccessible interface, so that it may be later used by the function members on the interface. After instantiating an JAccessible interface, the AccessibleObjectFromPoint function returns a pointer to this interface to the client (step 706). The processing of both the AccessibleObjectFromWindow and the AccessibleObjectFromEvent functions is similar to that described in FIG. 7, except that in step 702, these functions need only obtain the window class because the functions receive the current window handle as a parameter.

Figure 8:
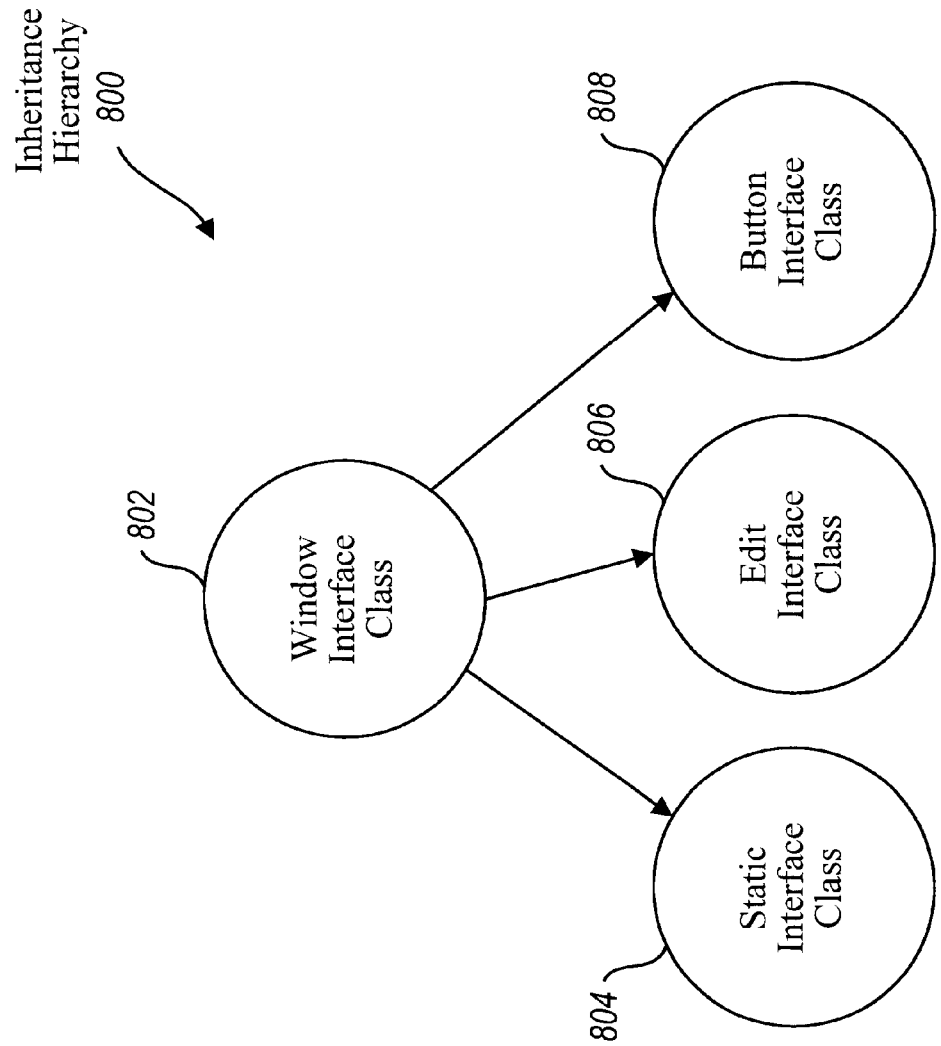
FIG. 8 depicts the inheritance hierarchy of the user interface elements depicted in FIG. 5.

As stated above, the access component maintains interface data structures for the various types of user interface elements that it supports. These interface data structures are combined to form an inheritance hierarchy 800 like that shown in FIG. 8. This inheritance hierarchy 800 is an example hierarchy that is suitable for use with the user interface depicted in FIG. 5. One skilled in the art will appreciate that inheritance hierarchies for other user interfaces having additional or different user interface elements can be defined. The base class of the inheritance hierarchy 800 is the window interface class 802 from which the static interface class 804, the edit interface class 806, and the button interface class 808 are derived. The window interface class 802 provides various default implementations of the function members on the IAccessible interface, and the derived interface classes 804, 806, and 808 may either utilize the default implementation provided by the window interface class or they may choose to "override" the default implementation and provide their own implementation of one or more of the function members based on their own specific needs. In the example of FIG. 5, the dialog box may be an instance of the window interface class 802, the static text may be an instance of the static interface class 804, the edit box may be an instance of the edit interface class 806, and the buttons may be instances of the button interface class 808. It should be appreciated that the window interface class 802 is derived from various standard OLE interfaces such as the IDispatch interface and the IUnknown interface.

The IAccessible Interface

Below, the IAccessible interface is described. First, the properties on the interface are described, and second, each of the function members on the interface are described. When describing the function members, example implementations of the function members are provided including both default implementations provided by the window interface class 802 and overriding implementations provided by some of the derived classes. Although such example implementations are provided, one skilled in the art will appreciate that other implementations can be used.

IAccessible Properties

Below, each of the properties on the IAccessible interface is described. These properties include: (1) the Name property, (2) the Role property, (3) the State property, (4) the Value property, (5) the Description property, (6) the Focus property, (7) the Selection property, (8) the Default Action property, (9) the Location property, (10) the Help property, (11) the Help Topic property, and (12) the Keyboard Shortcut property.

1. Name Property

The Name property is a string used by the server to identify a user interface element. For example, the text on a button is its name, while the title of an edit box is its name.

2. Role Property

The Role property describes a user interface element's role or function. For example, a user interface element's role may be that of a scroll bar, a window, an edit box, etc. The Role property describes the user interface element's purpose in terms of its relationship with other user interface elements, like its siblings or children.

3. State Property

The State property describes a user interface element's current status and an "alert level" (e.g., low, medium, or high) that indicates the importance of the status. A client can use these alert levels to gauge the information's urgency.

Some of the states of a user interface element supported by the preferred architecture follow:

| State | Meaning |
| --- | --- |
| STATE_SYSTEM_ALERT_HIGH | It is important that this information be conveyed to the user immediately. For example, a battery level indicator reaching a critical level conveys truly urgent information, so a screen reader utility should announce this information immediately. |
| STATE_SYSTEM_ALERT_LOW | This information is of low priority, so the user need not be immediately informed that it occurred. |
| STATE_SYSTEM_ALERT_MEDIUM | The user should be informed that this information is available, but the informational content need not be conveyed immediately. For |

-continued

| State | Meaning |
|---|---|
| | example, when a battery level indicator reaches a low level, it should generate a medium-level alert. Screen reader utilities could then generate a sound to let the user know that important information is available, without actually interrupting the user's work. The user could then query the alert information at his or her leisure. |
| STATE_SYSTEM_ANIMATED | This status indicates that the user interface element's appearance is changing rapidly or constantly. |
| STATE_SYSTEM_BUSY | This status indicates that the user interface element cannot accept input at this time. |
| STATE_SYSTEM_CHECKED | This status indicates that the user interface element's check box is selected. |
| STATE_SYSTEM_FOCUSABLE | This status indicates that the user interface element can accept the keyboard input focus. |
| STATE_SYSTEM_FOCUSED | This status indicates that the user interface element has the keyboard input focus. |
| STATE_SYSTEM_INVISIBLE | This status indicates that the user interface element is hidden or invisible. |
| STATE_SYSTEM_MARQUEED | This status indicates that text is being scrolled or moved. |
| STATE_SYSTEM_MIXED | This status indicates a three-state check box or toolbar button. |
| STATE_SYSTEM_MULTI-SELECTABLE | This status indicates that the user interface element can select multiple items. |
| STATE_SYSTEM_OFFSCREEN | This status indicates that the user interface element is currently off the display and not visible. |
| STATE_SYSTEM_PRESSED | This status indicates that the user interface element is pressed. |
| STATE_SYSTEM_READONLY | This status indicates that the user interface element is read only. |
| STATE_SYSTEM_SELECTABLE | This status indicates that the user interface element can accept selection. |
| STATE_SYSTEM_SELECTED | This status indicates that the user interface element is currently selected. |

4. Value Property

The Value property represents visual information contained by the user interface element. For example, the value for an edit box is the text it contains, but a menu item has no value.

5. Description Property

A user interface element's Description property provides a textual description for a user interface element's visual appearance. For example, if the user interface element is a scissor button, the description may be a "button displaying a pair of scissors."

6. Focus Property

A user interface element's focus property indicates which one of its children has the keyboard focus. It should be noted that user interface element selection and user interface element focus are two entirely different ideas. The "focused" user interface element is the one user interface element in the entire system that receives keyboard input, while the "selected" user interface element is marked to participate in some type of group operation. Additionally, focused items can be in or out of a selection of items. For example, you can select several items in preparation for moving or deleting them all. However, the focus is given only to one user interface element in the system at a time.

7. Selection Property

A user interface element's Selection property indicates which of its children are selected.

8. DefaultAction Property

A user interface element's DefaultAction property describes its primary method of manipulation from the user's viewpoint. The DefaultAction property is different than the user interface element's Value property. Some user interface elements, such as an edit box, may have a value but not a default action. Consider the following examples:

1) A selected check box has a default action of "Uncheck" and a value of "Checked."

2) A cleared check box has a default action of "Check" and a value of "Unchecked."

3) A button labeled "Print" has a default action of "Press," with no value.

4) An edit box that shows "Printer" has no default action, but would have a value of "Printer."

9. Location Property

The Location property contains the coordinates of the "bounding rectangle" of the user interface element on the video display. That is, the perimeter of a user interface element forms a rectangle, and the location property specifies the Cartesian coordinates for the upper left corner and the lower right corner of the rectangle relative to the video display.

10. Help Property

The Help property contains help text that is associated with a user interface element. For example, the Help property for a toolbar button that shows a printer may be "Prints the current document." This text is not always unique within the user interface; it acts purely to elaborate on the user interface element's purpose and what actions it might perform.

11. HelpTopic Property

The HelpTopic property contains details about a Help file that provides information about a user interface element. The details are provided in the form of a string that represents the path to the Help file and a value identifying the topic of interest. The path name retrieved may be a network path (e.g., "\\network\share\directory\filename.ext") or a Uniform Resource Locator (URL) to an Internet resource (e.g., "http://www.microsoft.com/windows/enable/helpfile.htm").

12. KeyboardShortcut Property

The KeyboardShortcut property is a string describing a key or key combination that will activate the user interface element. This shortcut key string can be used to describe "shortcut keys" or "access keys." Each is described in the following table:

| Term | Description |
|---|---|
| Shortcut keys | Key combinations that invoke an action. For example, CTRL + 0 is often used to invoke the Open file common dialog box. |
| Access keys | Single keys, usually shown underlined in a drop-down menu or dialog box, that invoke an action when pressed. For example, if a user activates an application's File menu, the "o" key often invokes the Open file common dialog box. Access keys are usually only available when the user interface element, like a menu, has keyboard focus. |

The KeyboardShortcut property reflects shortcuts as the key or keys the user must press when the user interface element has keyboard focus. For example, the Print menu command might have both a shortcut key (CTRL+P) and an access key (P). If the user presses "CTRL+P" while the menu is active, nothing happens, but pressing "P" invokes the application's Print dialog box. In this case, the KeyboardShortcut property is "P" to reflect what the user must press when the menu is active and has keyboard focus.

IAccessible Function Members

As stated above, the access component exposes an IAccessible interface on behalf of the server so that the client can directly access and manipulate the user interface elements of the server. Below, each of the function members on the IAccessible interface is described. These function members include: (1) accDoDefaultAction, (2) accHitTest, (3) accLocation, (4) accNavigate, (5) accSelect, (6) get_accChild, (7) get_accChildCount, (8) get_accDefaultAction, (9) get_accDescription, (10) get_accFocus, (11) get_acchelp, (12) get_accHelpTopic, (13) get_accKeyboardShortcut, (14) get_accName, (15) get_accParent, (16) get_accRole, (17) get_accSelection, (18) get_accState, (19) get_accValue, (20) put_accName, and (21) put_accValue.

1. IAccessible::accDoDefaultAction

HRESULT accDoDefaultAction(VARIANT varchild);

This function member performs the user interface element's default action and returns S_OK if successful or an error code otherwise.

varChild—[in] This parameter is a variant value identifying the user interface element whose default action will be invoked. This parameter may indicate that the default action of a child of the identified user interface element should be invoked. The variant structure is a union that can contain many types of data. The first element of the variant structure is the vt element, which describes the type of data contained in at least one of the remaining elements. The variant structure is described in greater detail in Brockschmidt, *Inside OLE,* at pages 647–653. The notation "[in]" indicates that the varChild parameter is an input parameter only; it is not used to output a value.

The window interface class' default implementation for this function member returns false, because a window does not have a default action. Similarly, the implementation of this function member for the edit interface class returns false, because an edit box does not have a default action. The implementation of this function member for the button interface class, however, does have an overriding implementation because buttons do have a default action: a button can be pressed. Therefore, this implementation sends a message to the window procedure of the user interface element ("the current user interface element") using its window handle (i.e., the current window handle) with the message type being BM_CLICK. Sending this type of message will cause the button's window procedure to act as though the button were activated. Messages are sent in the system by invoking the well-known SendMessage operating system function. This function has four parameters: the window handle of the destination window procedure, the message type (e.g., BM_CLICK), a wParam parameter, and an lParam parameter. Both the lParam and lParam parameters contain information that is specific to the particular type of message.

2. IAccessible::accHitTest

HRESULT accHitTest(long xLeft, long yTop, VARIANT * pvarchild);

This function member retrieves a reference to the IDispatch interface of a user interface element at a given point on the screen and returns S_OK if successful or an error code otherwise.

xLeft and yTop—[in] These parameters contain screen coordinates of a point on the video display.

pvarChild—[out, retval] This parameter is the address of a VARIANT structure that will contain information describing the user interface element at the point specified by the xLeft and yTop parameters, if any. If the specified point exists outside the current user interface element's boundaries, the vt element indicates that there is no data in the structure. Otherwise, the vt member indicates that a user interface element's IDispatch interface pointer is contained in the structure.

Figure 9:
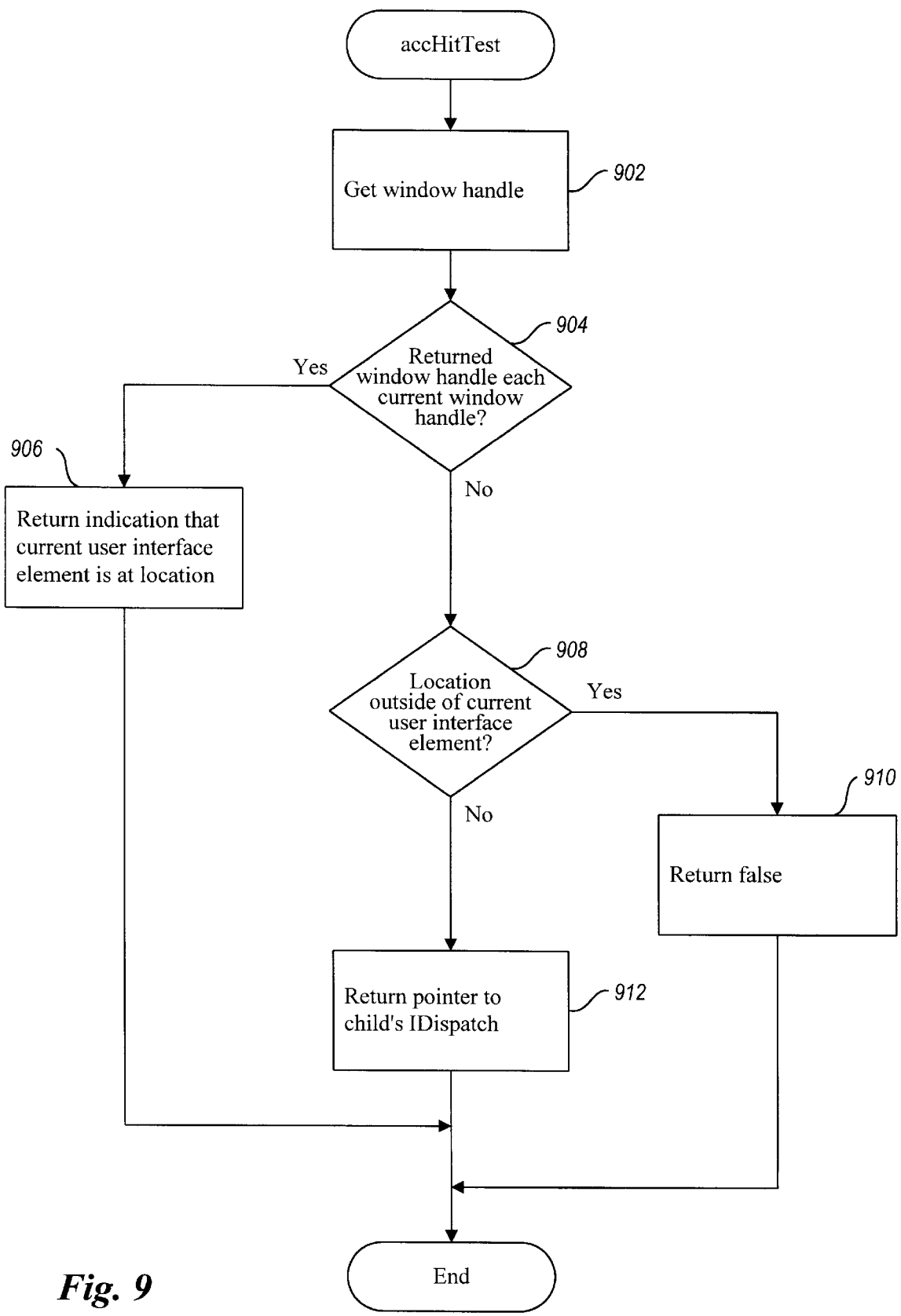
FIG. 9 depicts a flowchart of the steps performed by the accHitTest function member.

The default implementation provided by the window interface class is sufficient for all of the needs of the derived classes, and thus the derived classes need not override this function member. FIG. 9 depicts a flowchart of the steps performed by the window interface class' implementation of the accHitTest function member. The first step performed by the accHitTest function member is to obtain the window handle for the user interface element specified by the received screen coordinates (step 902). The accHitTest function member retrieves the window handle by invoking the well-known WindowFromPoint function provided by the operating system. Next, the accHitTest function member compares the returned window handle to the current window handle to determine if they are equivalent (step 904). If the window handles are equivalent, the accHitTest function member returns an indication that the current user interface element is located at the location (step 906). However, if the window handles are not equivalent, the accHitTest function member determines if the location is outside of the current user interface element (step 908). To make this determination, the accHitTest function member invokes the accLocation function member (described below) to identify the current user interface element's location and compares this location to the location received as a parameter. If the received location is outside of the current user interface element, the accHitTest function member returns false (step 910). However, if the location is within the current user interface element, a child of the current user interface element is indicated by the received location, so the accHitTest function member returns a pointer to the child's IDispatch interface. As stated above, each IAccessible interface is derived from the IDispatch interface. Thus, if the child has an instantiated IAccessible interface, in this step, the accHitTest function member returns a pointer to the IDispatch interface from which the child is derived. If, however, the child does not have an instantiated IAccessible interface, in this step, the accHitTest function member determines the class of the child window and instantiates an appropriate IAccessible interface for it.

3. IAccessible::accLocation

HRESULT accLocation(long * pxLeft, long * pyTop, long * pcxWidth, long * pcyHeight, VARIANT varchild);

This function member retrieves the user interface element's current display location (if the user interface element is visible on the screen) and, optionally, the child user interface element. This function member returns S_OK if successful or an error code otherwise.

pxLeft and pyTop—[out] These parameters specify the x and by coordinates of the upper left boundary of the user interface element's location.

pcxWidth and pcyheight—[out] These parameters contain a value specifying the user interface element's width and height, in pixels.

varChild—[in] This parameter contains a value identifying the user interface element whose location will be retrieved. This parameter may identify a child of the user interface element, if the child supports the IAccessible interface.

The window interface class' default implementation of this function member invokes the GetWindowRect well-known operating system function passing in the current window handle and receives the screen coordinates of where the current interface element is located. The screen coordinates are returned to the caller. This implementation is sufficient for the needs of all of the derived classes, thus the derived classes do not override this function member.

4. IAccessible::accNavigate
HRESULT accNavigate(long navDir, VARIANT varStartFromChildOrSelf, VARIANT * pvarEndUpAt);

This function member retrieves the next or previous sibling user interface element or child user interface element in a specified direction. This function member returns S_OK if successful or an error code otherwise.

NavDir—[in] This parameter is a value specifying the direction in which to move from the indicated user interface element, which is either the current user interface element or one of its children. This direction can be in spatial order where the direction is specified relative to the video display (e.g., up, down, left, or right), or this direction can be in navigational order where the direction is specified in relation to other user interface elements in a sequence (e.g., first, last, previous, or next).

The navDir parameter may take any one of the following values:

| | |
|---|---|
| NAVDIR_UP | Requesting user interface elements physically above the current one relative to the video display. |
| NAVDIR_DOWN | Requesting user interface elements physically below the current one. |
| NAVDIR_LASTCHILD | Go to the last child of this user interface element. |
| NAVDIR_FIRSTCHILD | Go to the first child of this user interface element. |
| NAVDIR_LEFT | Requesting user interface elements physically to the left of the current one. |
| NAVDIR_RIGHT | Requesting user interface elements physically to the right of the current one relative to the video display. |
| NAVDIR_NEXT | The next logical location or user interface element, generally a "sibling" to the current user interface element. For example, in a dialog box, the TAB key moves to the next logical location, although this can be represented in any number of different physical directions. |
| NAVDIR_PREVIOUS | The previous logical location or user interface element. In a dialog box, the SHIFT + TAB key combination moves to the previous logical control, although this may be in any number of physical directions visually on the screen. For example, in vertical toolbars, logically the previous button is often the button physically above (NAVDIR_UP) the current one, whereas in horizontal toolbars, logically the previous button is generally the button physically to the left (NAVDIR_LEFT) of the current one. | varStartFromChildOrSelf—[in] This parameter is a VARIANT structure that specifies whether the navigation starts from the current user interface element or one of its children. The function member may retrieve a sibling user interface element or a child user interface element.

pvarEndUpAt—[out, retval] This parameter is an address of a VARIANT structure that will contain information about the destination user interface element. This information may include the address of the destination user interface element's IDispatch interface or an identifier of the user interface object if it does not support the IDispatch interface.

Figure 10:
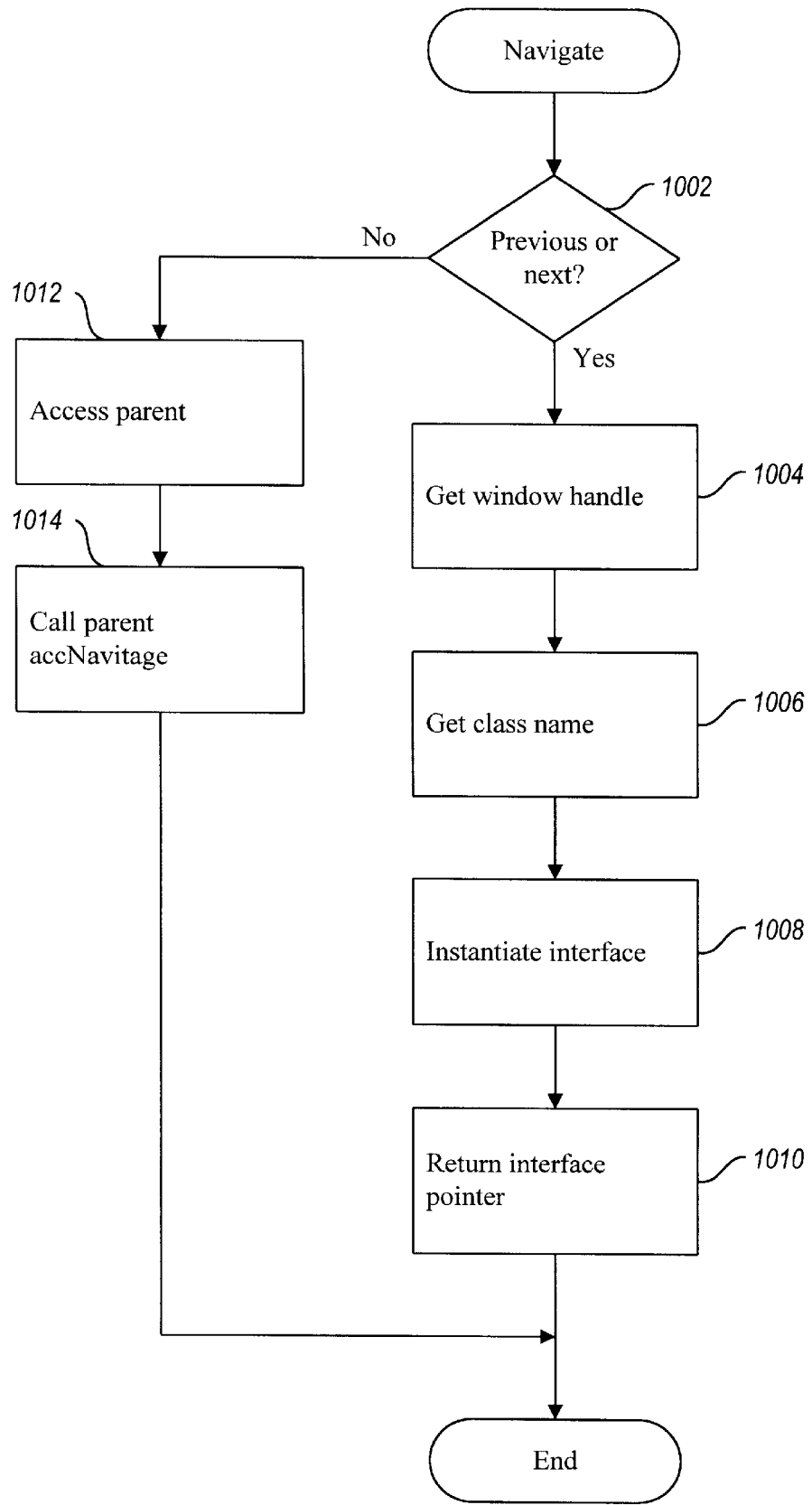
FIG. 10 depicts a flowchart of the steps performed by the accNavigate function member.

The default implementation of the accNavigate function member provided by the window interface class is sufficient for the needs of all of the derived classes. Therefore, the derived classes do not override this function member. FIG. 10 depicts a flowchart of the steps performed by the window class' implementation of the accNavigate function member. The first step performed by the accNavigate function member is to determine whether the NavDir parameter indicates previous or next for the navigational direction (step 1002). If the NavDir parameter indicates that previous or next is the navigational direction, the accNavigate function member obtains the window handle for either the previous or next user interface element (step 1004). In this step, the accNavigate function member invokes the well-known GetWindow operating system function indicating either GW_HWNDNEXT or GW_HWNDPREV, which returns the window handle of the next or previous user interface element, respectively. After receiving the window handle, the accNavigate function member obtains the class name for the user interface element by invoking the well-known GetClassName operating system function, which returns the class name of the user interface element (step 1006). After receiving the class name, the accNavigate function member instantiates an appropriate IAccessible interface for the returned class (step 1008). For example, if the class name indicates that the returned class is a button, the accNavigate function member instantiates an IAccessible interface for a button. The accNavigate function member then returns a pointer to the IDispatch interface as inherited by the IAccessible interface for this user interface element (step 1010).

If the navigational direction is not previous or next, the navigational direction is either up, down, left, right, first child, or last child. Only the parent of the current user interface element knows how its children are displayed, and thus, the accNavigate function member retrieves the IAccessible interface pointer for its parent by invoking the accParent function member (described below) (step 1012). After receiving a pointer to the current user interface element's parent, the accNavigate function member invokes the parent's accNavigate function member passing the parameters received (i.e., NavDir and varStartFromChildOrSelf), which returns a pointer to the IDispatch interface for the appropriate user interface element that is returned to the caller (step 1014). Additionally, other indications of the appropriate user interface element can be returned. The parent's accNavigate function member knows the locations of all of its child windows on the computer display and is thus able to retrieve an IAccessible interface pointer for the user interface element in the desired direction.

5. IAccessible::accSelect
HRESULT accSelect(long flagsSelect, VARIANT varChild);

This function member modifies the selection or moves the keyboard focus according to the specified flags. This function member returns S_OK if successful or an error code otherwise.

flagsSelect—[in] This parameter is a value specifying how to change the current selection. For example, this value specifies whether to add only the indicated user interface element to the selection, whether the selection should be extended to include the indicated user interface element and all unselected user interface elements in between, whether the indicated user interface element should be removed from the selection, or whether the indicated user interface element should be the only user interface element selected. Additionally, these flags indicate whether the indicated user interface element should be given focus.

varChild—[in] This parameter is a value identifying the user interface element that will be selected or a child of the user interface element.

Figure 11:
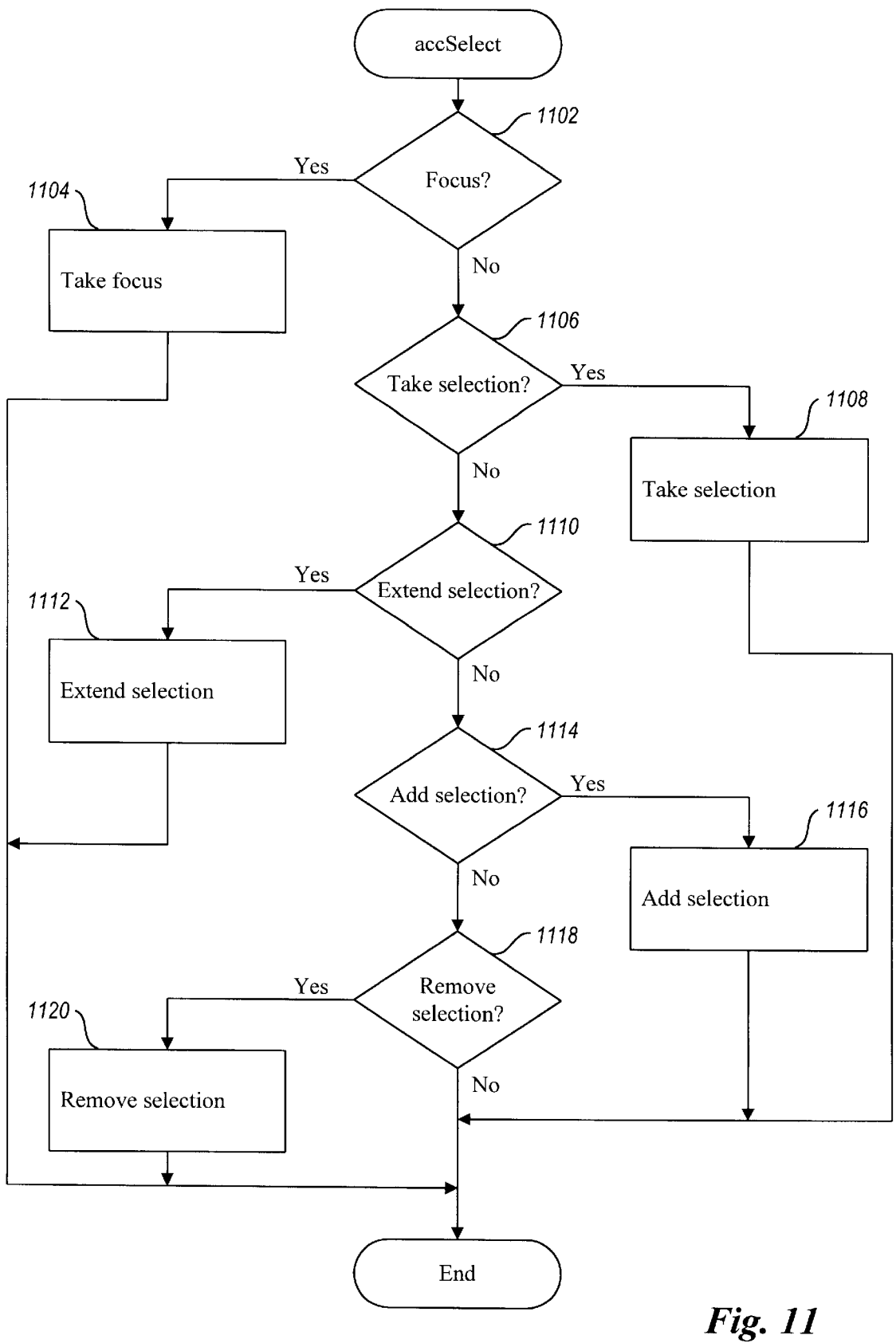
FIG. 11 depicts a flowchart of the steps performed by the accSelect function member.

Since a window, an edit box, a button, and a static text field cannot be selected, the implementation for these interfaces do not perform any significant processing. However, a list box containing items that can be selected does have an implementation that performs significant processing. FIG. 11 depicts a flowchart of exemplary steps performed by a list box's implementation of the accSelect function member. The first step performed by the accSelect function member is to determine whether it is requested to set focus to the indicated user interface element (step 1102). This determination is made by examining the flagsSelect parameter. If the flagsSelect parameter indicates to set focus to the indicated user interface element, the accSelect function member sets the focus of the computer system to the indicated user interface element (step 1104). In this step, the accSelect function member sends a message to the window procedure of the indicated user interface element specifying LB_SETCARETINDEX as the message type with an indication of the user interface element. If the flagsSelect parameter does not indicate to set focus, the accSelect function member determines whether the flagsSelect parameter indicates to take selection, where the indicated user interface element becomes the only user interface element selected (step 1106). If the flagsSelect parameter indicates to take selection, the accSelect function member takes selection by setting the indicated user interface element to be the only selected user interface element in the system (step 1108). This step is performed by sending a message to the indicated user interface element's window procedure with LB_SETSEL as the message type and with the wParam parameter set to false, indicating removal of all selections, and then by sending the same message with the wParam parameter set to true to indicate that the user interface element that should be selected.

If the flagsSelect parameter does not indicate to take selection, the accSelect function member determines whether the flagsSelect parameter indicates to extend a selection (step 1110). If the flagsSelect parameter indicates to extend the selection, the accSelect function member extends the selection by sending a message of type LB_SELITEMRANGE to the window procedure of the indicated user interface element with an identifier of the child to which the selection should be extended (step 1112). If the flagsSelect parameter does not indicate to extend the selection, the accSelect function member determines whether the flagsSelect parameter indicates to add a selection (step 1114). If the flagsSelect parameter indicates to add a selection, the accSelect function member adds a selection by sending a LB-SETSEL message to the window procedure of the indicated user interface element's parent with the wParam parameter set to true and with an identifier of the child to be selected. If the flagsSelect parameter does not indicate to add a selection, the accSelect function member determines if the flagsSelect parameter indicates to remove a selection (step 1118), and if so, the accSelect function member removes a child from the selection by sending a LB_SETSEL message to the indicated user interface element's parent with the wParam parameter set to false and with an identifier of the child.

6. IAccessible::Get accChild
HRESULT get_Child(VARIANT varChild, IDispatch** ppdispChild);

This function member retrieves an IDispatch interface of the specified user interface element or its child and returns S_OK if successful or an error code otherwise.

varChild—[in] This parameter is a VARIANT structure that identifies the user interface element to be retrieved or a child of the user interface element.

PpdispChild—This parameter is a reference to the IDispatch interface for the specified user interface element.

None of the derived classes have an implementation of the get_accChild function member, because the derived classes are atomic in nature and do not have any children. The implementation of the window interface class invokes the GetWindow well-known operating system function passing in the current window handle and an indication of GW_FIRSTCHILD to obtain the window handle for the child. After the window handle for the child is obtained, the class of the child is determined (e.g., a button), an IAccessible interface for the child is instantiated as previously described, and a pointer to the IDispatch interface for this child is returned.

7. IAccessible::get accChildCount
HRESULT get_accChildCount(long* pcountChildren);

This function member retrieves the number of children belonging to the specified user interface element and returns S_OK if successful or an error code otherwise.

pcountChildren—[out, retval] This parameter is an address of a variable that will contain the number of child user interface elements belonging to the specified user interface element.

Figure 12:
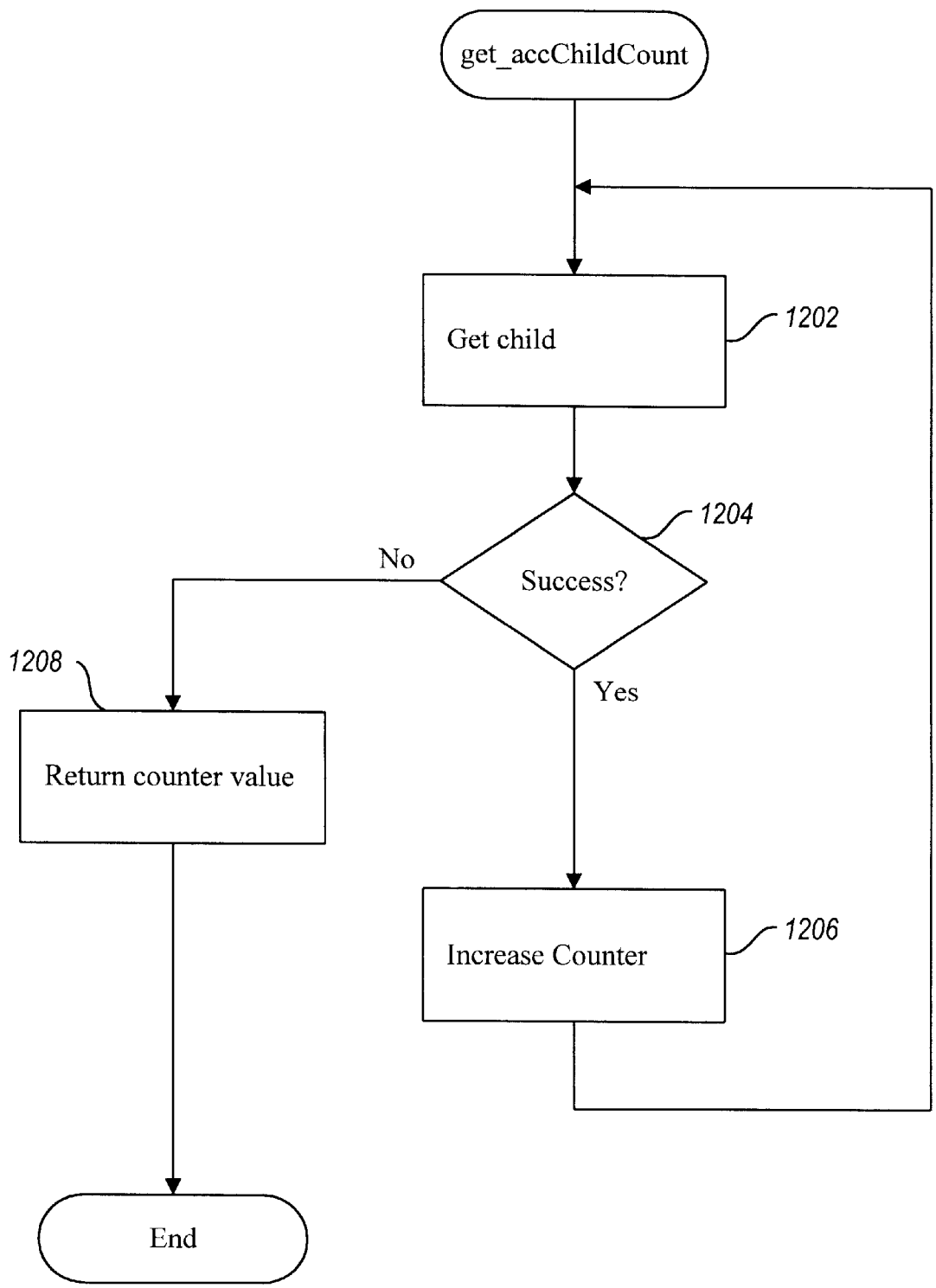
FIG. 12 depicts a flowchart of the steps performed by the get-accChildCount function member.

The only class in the inheritance hierarchy that supports this function member is the window interface class, since the derived classes are atomic in nature and do not have any children. FIG. 12 depicts a flowchart of the steps performed by the window class' implementation of the get_accChildCount function member. The first step performed by the get_accChildCount function member is to obtain a window handle to a child (step 1202). In this step, the get_accChildCount function member invokes the well-known GetWindow function of the operating system passing in the current window handle and an indication of GW_CHILD which returns the window handle of the first child of the window. The get_accChildCount function member then determines if the call was successful (step 1204). If the call was successful, the get_accChildCount function member increases the value of a counter (step 1206) and continues to step 1202. If the call was not successful, the value of the counter is returned which identifies the number of the children of the parent (step 1208).

8. IAccessible::get accDefaultAction
HRESULT get_accDefaultAction(VARIANT varChild, BSTR* pszDefaultAction);

This function member retrieves a string that describes the user interface element's default action. This function member returns S_OK if successful or an error code otherwise.

varChild—[in] This parameter is a VARIANT structure that identifies the user interface element whose default action will be retrieved.

pszDefaultAction—[out, retval] This parameter is an address of a string describing the default action for this user interface element, or NULL if this user interface element has no default action. The retrieved string describes the action that is performed on a user interface element, not what the user interface element does as a result. That is, a toolbar button that prints a document would have a default action of "Press" rather than "Prints the current document."

The window interface class' default implementation returns a null string since there is no default action for a window. The edit interface class and the static interface class do not override the window class' implementation. The button interface class' implementation for this function member returns the string "press."

9. IAccessible::get accDescription

HRESULT get_accDescription(VARIANT varChild, BSTR* pszDescription);

This function member retrieves a string in the Description property that describes the specified user interface element. This function member returns S_OK if successful or an error code otherwise.

varChild—[in] This parameter is a value identifying the user interface element whose description will be retrieved.

pszDescription—[out, retval] This parameter is an address of a string describing the specified user interface element. The user interface element description conveys the user interface element's visual appearance to the user.

Each class provides its own implementation of this function member which is specific to the particular class. For example, the window interface class returns a string indicating "this is a window." Similarly, the edit interface class returns a string containing "this is an edit box," the button interface class returns the string "this is a button," and the static interface class returns a string "this is static text."

10. IAccessible::get accFocus

HRESULT get_accFocus(VARIANT * pvarChild);

This function member retrieves the user interface element that currently has the keyboard focus. This function member returns S_OK if successful or an error code otherwise.

pvarChild—[out, retval] This function member is an address of a VARIANT structure that will contain information about the retrieved user interface element. If the specified user interface element does not contain a user interface element that has keyboard focus, then the vt member is VT_EMPTY. If vt is VT_DISPATCH, then the structure contains the address of the child user interface element's IDispatch interface.

Figure 13:
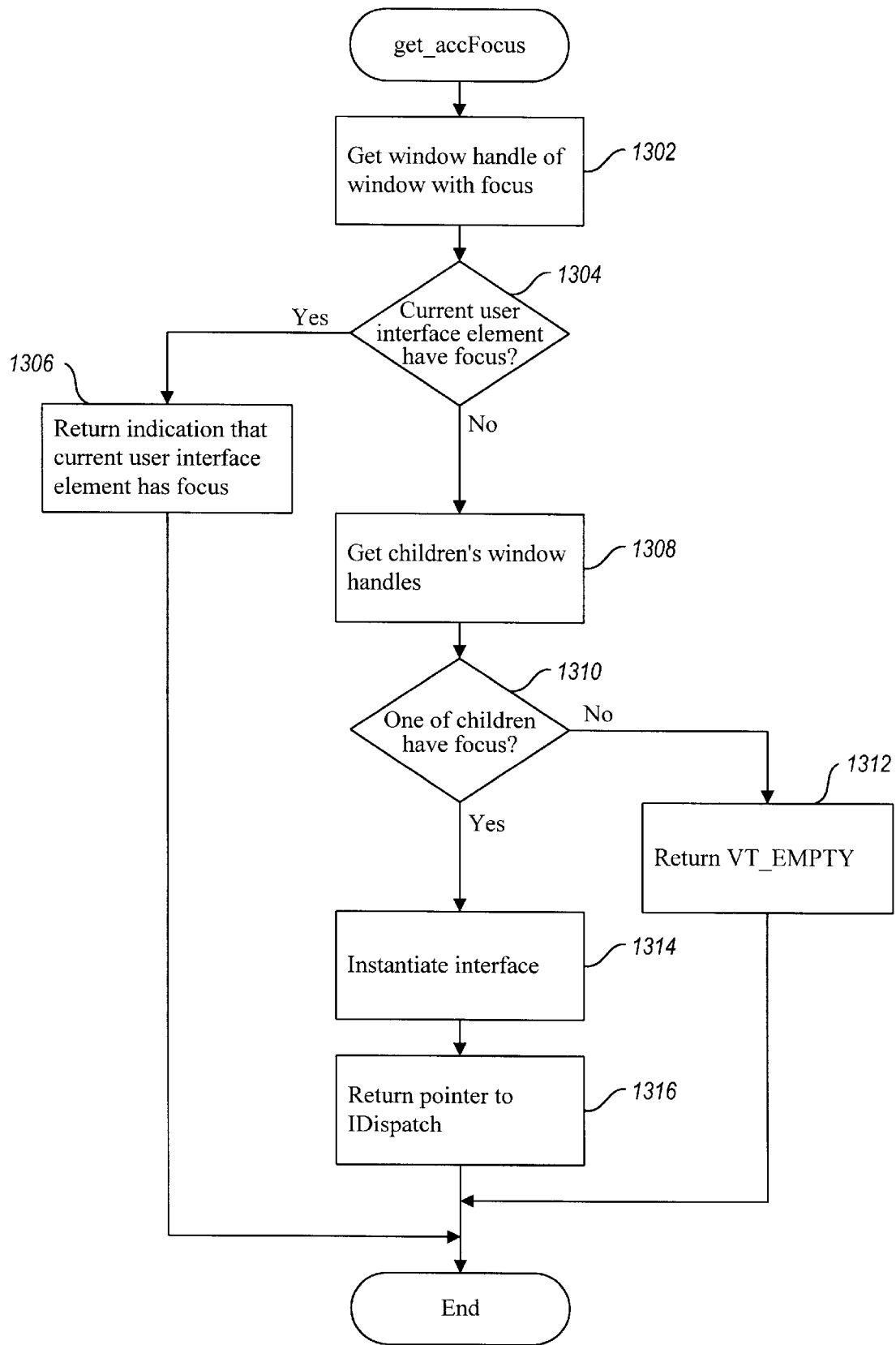
FIG. 13 depicts a flowchart of the steps performed by the get-accFocus function member.

The default implementation provided by the window interface class is not overridden by the derived classes. A flowchart of the steps performed by the window interface class' implementation of the get_accFocus function member is provided in FIG. 13. The get_accFocus function member first calls the well-known GetFocus function of the operating system to retrieve the window handle of the user interface element that currently has the focus (step 1302). The get_accFocus function member then determines if the current user interface element has focus by comparing the current window handle to the window handle retrieved by the GetFocus call (step 1304). If the returned window handle is the same as the current window handle, the get_accFocus function member returns an indication that the user interface element itself has the focus (step 1306). If the returned window handle is not equivalent to the current window handle, the get_accFocus function member obtains the window handles for each of its children (step 1308) and compares it to the returned window handle to determine if one of the children has the focus (step 1310). If a child has the focus, the get_accFocus function member instantiates an IAccessible interface for the child (step 1314) and returns a pointer to the IDispatch interface of the child to the caller (step 1316). Otherwise VT_EMPTY is returned (step 1312).

11. IAccessible::get accHelp

HRESULT get_accHelp(VARIANT varChild, BSTR * pszhelp);

This function member retrieves a user interface element's Help property string and returns S_OK if successful or an error code otherwise.

varChild—[in] This parameter contains a VARIANT structure that identifies the user interface element whose default action will be retrieved.

pszhelp—[out, retval] This parameter is an address of the Help property string for the specified user interface elements, or NULL if no Help string is available. A user interface element's Help property is represented in the form of a string that provides some helpful text to associate with the specified user interface element.

The window interface class' default implementation of the get_accHelp function member is not overridden by the derived classes. The help text for the user interface elements of an application program is maintained by the application program itself. Thus, the implementation of this function member queries the application program for the help text for a particular user interface element.

12. IAccessible::get accHelpTopic

HRESULT_get accHelpTopic(BSTR * pszHelpFile, VARIANT varChild, long * pidTopic);

This function member retrieves the full path of the Help file associated with the specified user interface element, as well as the address of the appropriate topic within that file. The system maintains a Help file with many topics and each topic has an associated string that provides useful information to the user. This function member returns S_OK if successful or an error code otherwise.

pszHelpFile—[out] This parameter is an address of a string describing the path of the Help file associated with the specified user interface elements, if any.

varChild—[in] This parameter is a VARIANT structure identifying the user interface element whose Help information will be retrieved.

pidtopic—[out, retval] This parameter is an address of a value identifying the Help file topic associated with the object.

The window interface class provides a default implementation that is not overridden by the derived classes. This default implementation queries the application program for the appropriate help topic information.

13. IAccessible::get accKeyboardShortcut

HRESULT get_accKeyboardShortcut(VARIANT varChild, BSTR * pszKeyboardShortcut);

This function member retrieves a user interface element's KeyboardShortcut property, and this function member returns S_OK if successful or an error code otherwise.

varChild—[in] This parameter is a VARIANT structure identifying the user interface element whose keyboard shortcut will be retrieved.

pszKeyboardShortcut—[out, retval] This parameter is an address of a string containing the keyboard shortcut string, or NULL if no keyboard shortcut is associated with this user interface element.

The window interface class does not provide a get_accKeyboardShortcut function member default implementation because this functionality is specific to the derived classes. The static interface class does not have an implementation, as it does not have a keyboard shortcut. The implementation provided by the button interface class calls the GetWindowName well-known function of the operating system which returns a string. The button implementation then parses the string for an "&" and returns the character following the "&" plus the string "ALT+" to the user (e.g., "ALT+N"), thus indicating the keyboard shortcut.

Figure 14:
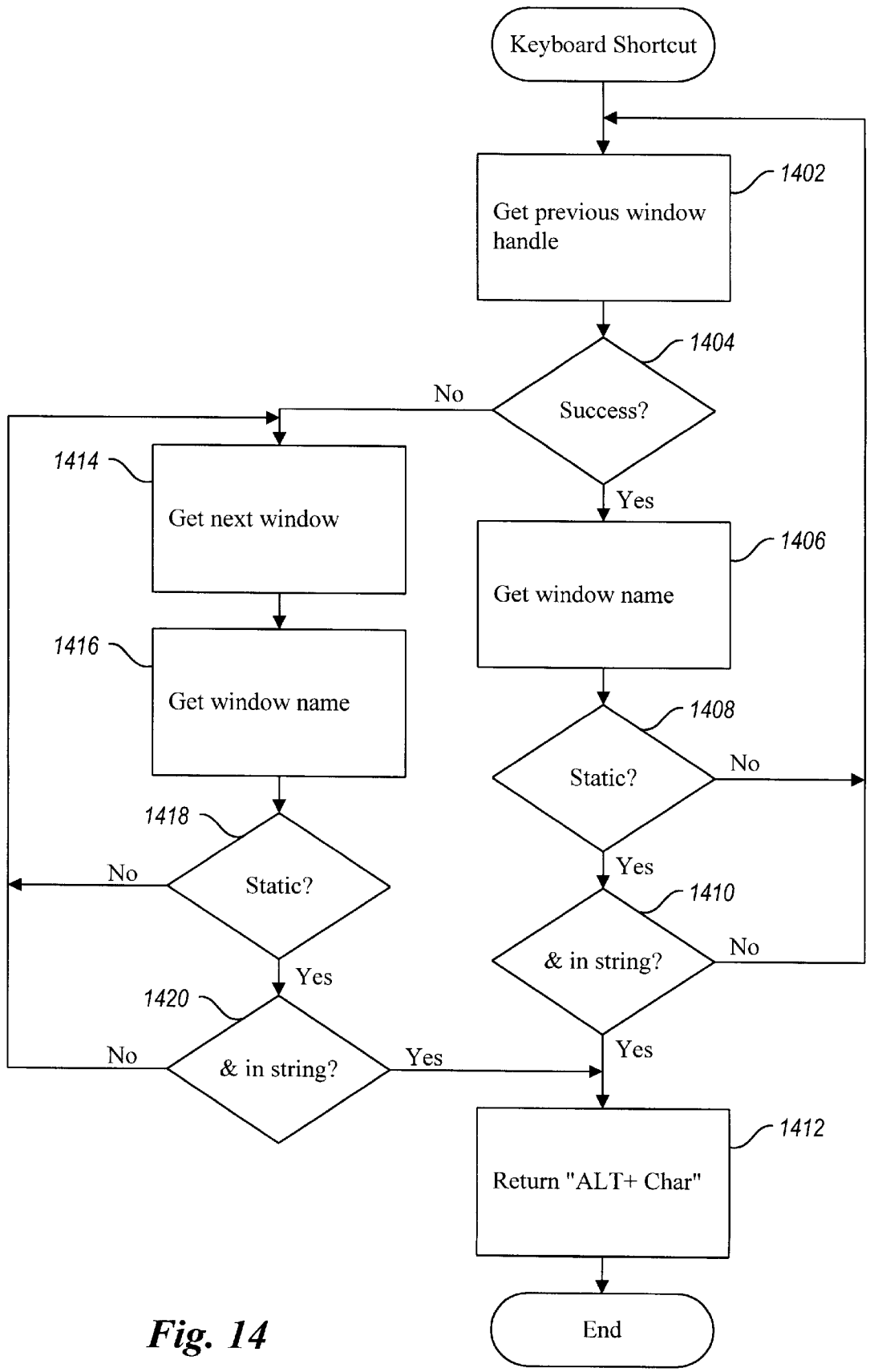
FIG. 14 depicts a flowchart of the steps performed by the get accKeyboard Shortcut function member.

Since an edit box does not contain an indication of the keyboard shortcut, the processing for the edit interface class' implementation is more complicated. The keyboard shortcut associated with an edit box is contained in a nearby static text field. FIG. 14 depicts a flowchart of the steps performed by the keyboard shortcut implementation provided by an edit class. The first step performed is to obtain the window handle for the previous user interface element (step 1402). In this step, the get_accKeyboardShortcut function member invokes the GetWindow function passing in the current window handle and GW_HWNDPREV. This call returns the window handle for the previous user interface element. After obtaining the window handle, the get_accKeyboardShortcut function member determines if the call was successful (step 1404). If the call was successful, the get_accKeyboardShortcut function member gets the window name by invoking the GetWindowName operating system function (step 1406) and determines if the window name indicates that the window is a static text window (step 1408). If the window is not a static text window, processing continues to step 1402 to obtain the window handle for another previous window. However, if the window is a static text window, the get_accKeyboardShortcut function member determines if there is an "&" in the name string (step 1410). If there is no "&" in the name string, processing continues to step 1402. However, if there is an "&" in the string, the get_accKeyboardShortcut function member returns the string "ALT+" and the character following the "&" to the user (step 1412).

In step 1404, if the call is unsuccessful, the get_accKeyboardShortcut function member retrieves the window handle for the next user interface element (step 1414). This is done by invoking the GetWindow function and indicating GW_HWNDNEXT. After obtaining the window handle for the next window, the get_accKeyboardShortcut function member obtains the window name (step 1406), determines if the window is a static text window (step 1408), and if so, determines if there is an "&" in the name (step 1420). If either the window is not a static text window or there is no "&" in the string, processing continues to step 1414. However, if the window is a static text window and there is an "&" in the string, processing continues to step 1412 to return the keyboard shortcut to the user.

14. IAccessible::get accName
HRESULT get_accName(VARIANT varChild, BSTR* pszName);

This function member retrieves the Name property for this user interface element and returns S_OK if successful or an error code otherwise.

varChild—[in] This parameter is a VARIANT structure identifying the user interface element whose name will be retrieved or a child of the user interface element.

pszName—[out, retval] This parameter is an address of a string containing this user interface element's name.

The window interface class' default implementation sends a message of type WM_GETTEXT to the operating system containing the current user interface element's window handle to obtain the appropriate text and returns this text to the user. Both the button interface class and the static interface class can utilize the default implementation. However, with the edit interface class, the text is not contained within the window itself but, rather, is contained in a nearby static. Therefore, the edit interface class' implementation of the get_accName function member invokes the GetWindow function indicating GW_HWNDPREV to obtain the window handle for the previous static text and then sends a WM_GETTEXT message to the operating system to retrieve the name and return it.

15. IAccessible::get accParent
HRESULT get_accParent(IDispatch** ppdispParent);

This function member retrieves the IDispatch interface of the indicated user interface element's parent. This function member returns S_OK if successful or an error code otherwise.

ppdispparent—[out, retval] This parameter is an address of a variable that will contain the parent's IDispatch interface. The variable will be set to NULL if no parent exists or the user interface element cannot access its parent.

The window interface class provides a default implementation that is utilized by all the derived classes. The default implementation invokes the well-known GetParent function of the operating system passing in the current window handle to obtain the window handle for the user interface element's parent. This window handle is then used to obtain the class name by using the GetClassName function, an IAccessible interface for this class is instantiated, and the pointer to the IDispatch interface as inherited by the IAccessible interface is returned.

16. IAccessible::get accRole
HRESULT get_accRole(VARIANT varChild, VARIANT * pvarRole);

This function member retrieves the user interface element's Role property and returns S_OK if successful or an error code otherwise.

varChild—[in] This parameter is a VARIANT structure that identifies the user interface element whose role will be retrieved.

pvarRole—[out, retval] This parameter is an address of a VARIANT structure that will contain an identifier or a string describing the user interface element's role.

Each class provides its own implementation specific to that particular class. For example, the window interface class returns a string "window," the button interface class returns a string "button," the edit interface class returns a string "edit," and the static interface class returns a string "static." Alternatively, instead of returning strings, the implementations provided by the interface classes may return an identifier.

17. IAccessible::get accSelection
HRESULT get_accSelection(VARIANT * pvarChildren);

This function member retrieves the selected children of the specified user interface element and returns S_OK if successful or an error code otherwise.

pvarChildren—[out, retval] This parameter is an address of a VARIANT structure that will contain information about the child object or objects. The vt member will be set to one of the following values, indicating the result.

| | |
|---|---|
| VT_DISPATCH | One child was selected and the address of its IDispatch interface is contained in the data. |
| VT_EMPTY | No children were selected. |
| VT_14 | One child was selected. |
| VT_UNKNOWN | Multiple children were selected. |

The get_accSelection function member is not implemented for the window interface class, edit interface class, button interface class, or static interface class because none of these types of user interface elements can be selected. However, if the class were a list box class containing a number of elements that can be selected, the get_accSelection function member returns an indication of each child selected by sending a message to the list box's window procedure indicating LB_GETSELCOUNT as the message type to obtain a list indicating which children are selected. Additionally, this function member may return a pointer to an IUnknown interface for the collection of selected children from which a pointer to an IEnumVariant interface can be obtained to traverse the selected children. The IEnumVariant interface is described in greater detail in Brockschmidt, Inside OLE at pp. 113–114.

18. IAccessible::get accState

HRESULT get_accState(VARIANT varChild, VARIANT * pvarState);

This function member retrieves the state property of the user interface element or its child. This function member returns S_OK if successful or an error code otherwise.

varChild—[in] This parameter is a VARIANT structure identifying the user interface element whose state will be retrieved.

pvarState—[out, retval] This parameter is a VARIANT structure that will contain information describing the user interface element's state.

Figure 15:
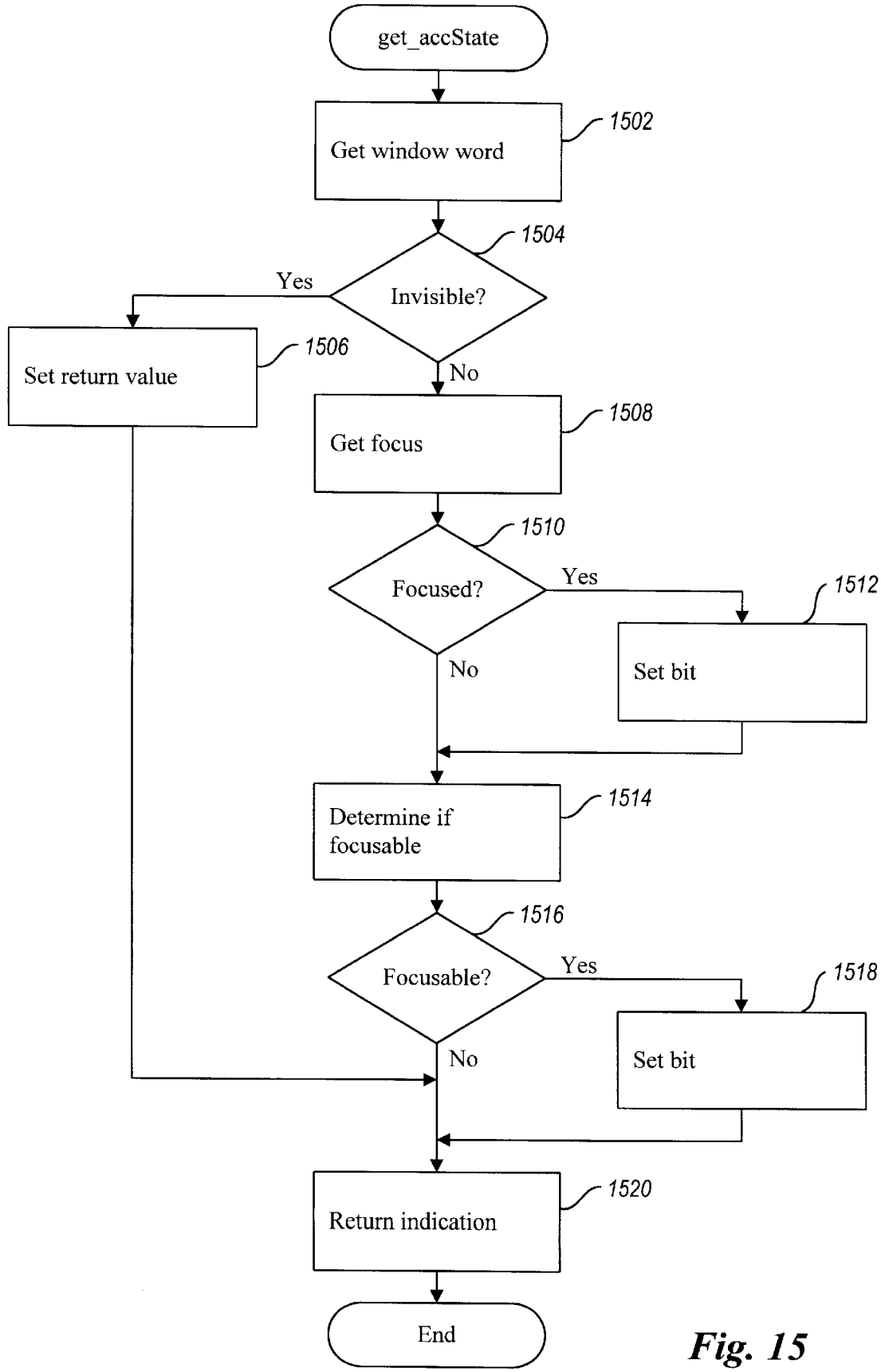
FIG. 15 depicts a flowchart of the steps performed by the get_accState function member.

FIG. 15 depicts a flowchart of exemplary steps performed by the edit interface class' implementation of the get_accState function member. Although only a subset of the states are described as being identified and returned, one skilled in the art will appreciate that the other states previously described can be returned. Additionally, one skilled in the art will appreciate that similar processing can be performed by other interface classes to implement this function member. The first step performed by the edit interface class get_accState function member is to obtain the window word using the GetWindowWord well-known operating system function passing in GWW_STYLE and the window handle of the current window (step 1502). The "window word" contains various status information for a user interface element. If the window word indicates that the user interface element is invisible (step 1504), the get_accState function member sets a return value to STATE_SYSTEM_INVISIBLE indicating that the user interface element is invisible (step 1506) and returns this return value (step 1520). However, if the user interface element is visible, the get_accState function member invokes the GetFocus function of the operating system to obtain a window handle of the window that currently has focus (step 1508). The get_accState function member then determines if the current user interface element has focus by comparing the current window handle to the returned window handle (step 1510). If the current user interface element has focus, the get_accState function member sets a bit in the return value indicating that the current user interface element has focus (step 1512).

If the current user interface element does not have focus, the get_accState function member determines if the current user interface element is focusable (step 1514). This determination is made by determining whether the edit box is on a window that is currently in the foreground. If the edit box is not on a foreground window, it cannot be focusable. The get_accState function member invokes the GetForegroundWindow function of the operating system to obtain the window handle for the top-level window that currently has focus and then performs successive GetParent function calls to return the window handles of all of the current user interface's ancestors (e.g., parent and grandparent) and compares these window handles to the window handle of the foreground window to determine if it is focusable (step 1516). If the current window is focusable, the get_accState function member sets a bit in the return value indicating that the edit box is focusable (step 1518). Next, the get_accState function member returns an indication of whether the edit box is invisible, focused, or focusable (step 1520).

19. IAccessible::get accValue

HRESULT get_accValue(VARIANT varChild, BSTR* pszvalue);

This function member retrieves the user interface element's Value property. This function member returns $S_{OK}$ if successful or an error code otherwise.

varChild—[in] This parameter is a VARIANT structure identifying the user interface element whose value will be retrieved.

pszValue—[out, retval] This parameter is an address of a variable that will contain a string containing the user interface element's current value.

Since there is no value for a button, window, or static, the button interface class, the window interface class, and the static interface class do not have an implementation for this function member. However, the edit interface class implementation invokes the GetWindowText function member passing the current window handle to obtain the value of that user interface element.

20. IAccessible::put accName HRESULT put_accName (VARIANT varChild, BSTR szName);

This function member sets the Name property for the indicated user interface element, and this function member returns S_OK if successful or an error code otherwise.

varChild—[in] This parameter is a value identifying the user interface element whose name will be set.

SzName—[in] This parameter is a string that specifies the name to be associated with this item.

The default implementation receives a string to be substituted for the name of the user interface element and sets the name accordingly.

21. IAccessible::put accValue

HRESULT put_accValue(VARIANT varChild, BSTR szvalue);

This function member sets the value of the user interface element's Value property for the current item. This function member returns S_OK if successful or an error code otherwise.

varChild—[in] This parameter is a VARIANT structure identifying the user interface element whose state will be retrieved.

szvalue—[in] This parameter is a string containing the value to assign to the user interface element.

The default implementation provided by the window interface class sends a message to the window procedure of the current user interface element with a message type of WM_SETTEXT and a reference to the text, as well as an indication of the size of the text. Upon receiving this message, the window procedure for the window will store this text as its value. The derived classes can utilize the default implementation.

While the present invention has been described with reference to a preferred embodiment thereof, those skilled in the art will know of various changes in form and detail that may be made without departing from the spirit and scope of the claimed invention as defined in the appended claims.

What is claimed is:

1. A method in a computer system having a client program, a legacy program with user interface elements, and an operating system for managing the client program and the user interface elements of the legacy program, comprising the steps of:

the client sending a request to the operating system for a reference to an interface of the legacy program, the interface containing function members that both access and manipulate characteristics of the user interface elements of the legacy program;

the operating system receiving the request and sending the request to the legacy program;

the legacy program receiving the request and returning an indication to the operating system that the legacy program does not support the interface;

the operating system receiving the indication from the legacy program, creating the interface on behalf of the legacy program, and returning a reference to the created interface to the client, the created interface containing the function members that both access and manipulate the characteristics of the user interface elements of the legacy program; and the client receiving the reference to the created interface and invoking the function members of the created interface to both access and manipulate the characteristics of the user interface elements of the legacy program.

2. The method of claim 1 wherein the operating system manages the user interface elements of the legacy program, wherein the operating system has functions that access and manipulate the user interface elements, and wherein the step of invoking the function members includes invoking the functions of the operating system to access and manipulate the user interface elements.

3. The method of claim 1 wherein each of the user interface elements has a window procedure that receives messages and that accesses and manipulates the characteristics of the user interface element responsive to receiving the messages, and wherein the step of invoking the function members includes sending messages to the window procedures of the user interface elements to access and manipulate the characteristics of the user interface elements.

4. A method in a computer system for providing access to user interface elements managed by an operating system, the method performed by the operating system comprising the steps of:

creating an instance of an interface for at least one of the user interface elements, the interface containing function members for use in accessing the user interface element; and exposing the instance of the interface to a client to provide the client with access to the user interface element via the function members of the interface.

5. The method of claim 4 further including the steps of receiving an indication that one of the function members on the interface has been invoked by the client, and accessing the user interface element responsive to receiving the indication.

6. The method of claim 5 wherein the user interface element has characteristics and wherein the step of accessing includes modifying one of the characteristics of the user interface element responsive to receiving the indication.

7. The method of claim 4 wherein the user interface elements managed by the operating system are displayed as part of a user interface of an application program.

8. A method in a computer system for providing a client program with access to user interface elements managed by an operating system, the method performed by the client program comprising the steps of:

sending a request to the operating system to receive a reference to an interface for at least one of the user interface elements, the interface containing function members for use in accessing the user interface element; and receiving the reference to the interface to provide access to the user interface element via the function members of the interface.

9. The method of claim 8 further including the steps of invoking one of the function members on the interface to access the user interface element.

10. The method of claim 9 wherein the user interface element has characteristics and wherein the step of invoking includes invoking the function member to modify one of the characteristics of the user interface element whereupon the operating system modifies the characteristic.

11. The method of claim 8 wherein the user interface elements managed by the operating system are displayed as part of a user interface of an application program.

12. A method in a computer system for accessing user interface elements of an application program that are managed by an operating system, the user interface elements being at locations on a video display, each location related to other locations via a direction relative to the video display, the method performed by the operating system comprising the steps of:

receiving a programmatic request from a client indicating one of the user interface elements of the application program and indicating a direction relative to the video display; and returning to the client a reference to a directional user interface element that is displayed at a location in the indicated direction from the indicated user interface element.

13. The method of claim 12 wherein the indicated direction indicates a right direction, and wherein the step of returning includes determining a right user interface element that is located to the right of the indicated user interface element on the computer display and returning a reference to the right user interface element.

14. The method of claim 12 wherein the indicated direction indicates a left direction, and wherein the step of returning includes determining a left user interface element that is located to the left of the indicated user interface element on the computer display and returning a reference to the left user interface element.

15. The method of claim 12 wherein the indicated direction indicates an up direction, and wherein the step of returning includes determining a user interface element that is located higher on the computer display than the indicated user interface element and returning a reference to the determined user interface element.

16. The method of claim 12 wherein the indicated direction indicates a down direction, and wherein the step of returning includes determining a user interface element that is located lower on the computer display than the indicated user interface element and returning a reference to the determined user interface element.

17. A method in a computer system for a client accessing user interface elements of an application program that are managed by an operating system, the user interface elements being at locations on a video display, each location related to other locations via a direction relative to the video display, the method performed by the client comprising the steps of:

sending a programmatic request to the operating system indicating one of the user interface elements of the application program and indicating a direction relative to the video display; and receiving from the operating system a reference to a directional user interface element that is displayed at a location in the indicated direction from the indicated user interface element.

18. The method of claim 17 wherein the indicated direction indicates a right direction, and wherein the step of receiving includes receiving a reference to a right user interface element that is located to the right of the indicated user interface element on the computer display.

19. The method of claim 17 wherein the indicated direction indicates a left direction, and wherein the step of receiving includes receiving a reference to a left user interface element that is located to the left of the indicated user interface element on the computer display.

20. The method of claim 17 wherein the indicated direction indicates an up direction, and wherein the step of receiving includes receiving a reference to a user interface element that is located higher on the computer display than the indicated user interface element.

21. The method of claim 17 wherein the indicated direction indicates a down direction, and wherein the step of receiving includes receiving a reference to a user interface element that is located lower on the computer display than the indicated user interface element.

22. A computer system comprising:
a video display for displaying user interface elements;
a memory, further comprising:
an application program for displaying the user interface elements on the video display;
an operating system for managing the user interface elements and for exposing an interface with function members for accessing the user interface elements; and
an accessibility aid for invoking the function members on the interface to access the user interface elements of the application program; and
a processor for running the application program, the operating system, and the accessibility aid.

23. A computer-readable medium containing instructions for controlling a computer system to perform a method for providing access to user interface elements managed by an operating system, the method performed by the operating system comprising the steps of:
creating an instance of an interface for at least one of the user interface elements, the interface containing function members for use in accessing the user interface element; and
exposing the instance of the interface to a client to provide the client with access to the user interface element via the function members of the interface.

24. A computer-readable medium containing instructions for controlling a computer system to perform a method for providing a client program with access to user interface elements managed by an operating system, the method performed by the client program comprising the steps of:
sending a request to the operating system to receive a reference to an interface for at least one of the user interface elements, the interface containing function members for use in accessing the user interface element; and
receiving the reference to the interface to provide access to the user interface element via the function members of the interface.

25. A computer-readable medium containing instructions for controlling a computer system to perform a method for accessing user interface elements of an application program that are managed by an operating system, the user interface elements being at locations on a video display, each location related to other locations via a direction relative to the video display, the method performed by the operating system comprising the steps of:
receiving a programmatic request from a client indicating one of the user interface elements of the application program and indicating a direction relative to the video display; and
returning to the client a reference to a directional user interface element that is displayed at a location in the indicated direction from the indicated user interface element.

26. A computer-readable medium containing instructions for controlling a computer system to perform a method for a client accessing user interface elements of an application program that are managed by an operating system, the user interface elements being at locations on a video display, each location related to other locations via a direction relative to the video display, the method performed by the client comprising the steps of:
sending a programmatic request to the operating system indicating one of the user interface elements of the application program and indicating a direction relative to the video display; and
receiving from the operating system a reference to a directional user interface element that is displayed at a location in the indicated direction from the indicated user interface element.

27. A method in a computer system having a client program, a legacy program, and an operating system, the legacy program having user interface elements to be displayed to a user of the legacy program, the operating system for managing display of the user interface elements to the user, the method for accessing the user interface elements of the legacy program by the client program on behalf of the user, comprising:
under control of the client program,
sending a request to the operating system for access to the user interface elements of the legacy program;
under control of the operating system,
receiving the request;
creating a data structure including a set of methods that provide access to the user interface elements; and
returning to the client program a response to the received request, the response including a reference to the created data structure; and
under control of the client program,
receiving the reference to the created data structure; and
accessing characteristics of one of the user interface elements of the legacy program by using at least one of the methods of the created data structure.

28. The method of claim 27 wherein the client program additionally modifies characteristics of one of the user interface elements of the legacy program by using at least one of the methods of the created data structure, the modifying such that a displayed visual appearance of the one element changes in accordance with the modifying.

29. The method of claim 27 wherein the accessed characteristics indicate a current display location of the one of the user interface elements.

30. The method of claim 27 wherein each of the user interface elements is an instance of a class, wherein the data structure is created for user interface elements that are derived from a specified base class, and wherein the created data structure is an interface for the base class such that the methods are function members for accessing and manipulating instances of the base class or of classes derived from the base class.

31. A method for an operating system to provide access to user interface elements of a first application program, the operating system managing display of the user interface elements in such a manner that information about the user interface elements is maintained by the operating system, the method comprising:
receiving from the first application program information about the user interface elements; and
making the received information about the user interface elements available to a second application program.

32. The method of claim 31 wherein the information made available to the second application program includes indications of display locations of the user interface elements.

33. The method of claim 32 wherein the user interface elements are currently displayed graphical user elements.

34. The method of claim 31 including accessing information from implementations of the user interface elements, and making the accessed information available to the second application program.

35. The method of claim 31 wherein the information maintained by the operating system includes internal representations of the user interface elements, and including making available to the second application program an indication of at least one function with which the second application program can access the internal representations.

36. The method of claim 31 wherein the user interface elements are designed to be manipulatable by a user of the first application program, and wherein the information made available to the second application program includes an indication of at least one function with which the second application program can manipulate the user interface elements such that the first application program is notified of the manipulating.

37. A computer-readable medium containing instructions for controlling an operating system to provide access to user interface elements of a first application program, the operating system managing display of the user interface elements in such a manner that information about the user interface elements is maintained by the operating system, by:
   receiving from the first application program information about the user interface elements; and
   making the received information about the user interface elements available to a second application program.

38. The computer-readable medium of claim 37 wherein the information made available to the second application program includes indications of display locations of the user interface elements.

39. The computer-readable medium of claim 37 wherein the information maintained by the operating system includes internal representations of the user interface elements, and wherein the operating system is further controlled to make available to the second application program an indication of at least one function with which the second application program can access the internal representations.

40. A method for an operating system to provide access to user interface elements of a first application program, the operating system managing display of the user interface elements in such a manner that information about the user interface elements is maintained by the operating system, the method comprising:
   under control of the operating system,
      receiving from a second application program a request for information about the user interface elements of the first application program; and
      in response to the request, sending to the second application program the information about the user interface elements, the sent information including an indication of display locations of the user interface elements.

41. The method of claim 40 wherein the user interface elements are currently displayed graphical user elements.

42. The method of claim 40 wherein the sent information is based on the information maintained by the operating system such that the response to the request is performed without soliciting information from the first application program about the user interface elements.

43. A method for a first application program to receive access to user interface elements of a second application program via an operating system, the operating system managing display of the user interface elements in such a manner that the operating system creates internal objects to represent the user interface elements, the method comprising:
   sending to the operating system a request for information about the user interface elements of the second application program;
   in response to the request, receiving from the operating system an indication of an interface to the created internal objects, the interface including function members that access and manipulate the created internal objects; and
   invoking one of the function members to access at least one of the created internal objects.

44. The method of claim 43 wherein the accessing is to provide information about display locations of the user interface elements.

45. The method of claim 43 wherein each of the created internal objects is an instance of a class, and wherein the interface is a data structure that provides access to objects that are instances of a base class or of classes derived from the base class.

46. A computer-readable medium for controlling a first application program to receive access to user interface elements of a second application program via an operating system, the operating system managing display of the user interface elements in such a manner that the operating system creates internal objects to represent the user interface elements, by:
   sending to the operating system a request for information about the user interface elements of the second application program;
   in response to the request, receiving from the operating system an indication of an interface to the created internal objects, the interface including function members that access and manipulate the created internal objects; and
   invoking one of the function members to access at least one of the created internal objects.

47. The computer-readable medium of claim 46 wherein the accessing is to provide information about display locations of the user interface elements.

48. The computer-readable medium of claim 46 wherein each of the created internal objects is an instance of a class, and wherein the interface is a data structure that provides access to objects that are instances of a base class or of classes derived from the base class.

49. A method for providing access to user interface elements of a program, the user interface elements managed by an operating system in such a manner that the operating system maintains an internal representation of the user interface elements, the method comprising:
   the operating system receiving a request from a client to access an indicated user interface element of the program;
   external to the program, retrieving information from the internal representation for the indicated user interface element that is maintained by the operating system; and
   providing the retrieved information from the operating system to the client so that the client can access the indicated user interface element.

50. The method of claim 49 wherein the program is a legacy program that is unable to provide access to the user interface elements in response to a request from the client for the access.

51. The method of claim 49 including:
   after the providing of the retrieved information and under control of the client, modifying the maintained internal representation for the indicated user interface element.

52. The method of claim 51 wherein in response to the modifying, the operating system notifies the program that the indicated user interface element has been manipulated.

53. The method of claim 49 including:
   after the providing of the retrieved information and under control of the client, manipulating the indicated user interface element of the program.

54. A method for a client to interact with a first program to access user interface elements of a second program, the user interface elements managed by an operating system such that the operating system maintains an internal representation of the user interface elements, the method comprising:
   under control of the client,
      sending a request to the first program to access an indicated user interface element of the second program;
      receiving information retrieved from the maintained internal representation for the indicated user interface element; and
   accessing the indicated user interface element by using the received information.

55. The method of claim 54 wherein the first program retrieves the maintained internal representation information from the operating system in response to receiving the sent request from the client, and wherein the receiving of the retrieved information by the client is in response to the first program sending the retrieved information to the client.

56. The method of claim 54 wherein the second program is a legacy program that is unable to provide access to the user interface elements in response to requests for the access from the first program or from the client.

57. The method of claim 54 wherein the accessing of the indicated user interface element includes manipulating the indicated user interface element.

58. The method of claim 54 wherein the accessing of the indicated user interface element includes modifying the internal representation for the indicated user interface element that is maintained by the operating system.

59. The method of claim 58 wherein in response to the modifying, the operating system notifies the second program that the indicated user interface element has been manipulated.

* * * * *